(12) United States Patent
Nagaoka et al.

(10) Patent No.: US 8,415,051 B2
(45) Date of Patent: Apr. 9, 2013

(54) BATTERY STORAGE STRUCTURE FOR ACOUSTIC EQUIPMENT

(75) Inventors: Yasunori Nagaoka, Hamamatsu (JP); Hirofumi Muramatsu, Hamamatsu (JP)

(73) Assignee: Roland Corporation, Hamamatsu-Shi, Shizuoka-Ken (JP)

( * ) Notice: Subject to any disclaimer, the term of this patent is extended or adjusted under 35 U.S.C. 154(b) by 420 days.

(21) Appl. No.: 12/792,608

(22) Filed: Jun. 2, 2010

(65) Prior Publication Data
US 2011/0076551 A1  Mar. 31, 2011

(30) Foreign Application Priority Data
Sep. 28, 2009 (JP) ................................. 2009-222158

(51) Int. Cl.
*H01M 2/00* (2006.01)
*H01M 2/02* (2006.01)
(52) U.S. Cl. ........................ 429/163; 429/178; 429/179
(58) Field of Classification Search .................. 429/179, 429/163, 178, 175
See application file for complete search history.

(56) References Cited

U.S. PATENT DOCUMENTS

| 6,773,850 B2 * | 8/2004 | Saito et al. ..................... 429/175 |
| 7,824,797 B2 * | 11/2010 | Nishino et al. ................. 429/163 |
| 2008/0156180 A1 * | 7/2008 | Bagale ............................ 84/743 |

FOREIGN PATENT DOCUMENTS
WO  WO 2009/041088  * 4/2009

\* cited by examiner

*Primary Examiner* — Milton I Cano
*Assistant Examiner* — Carlos Barcena
(74) *Attorney, Agent, or Firm* — Lee, Hong, Degerman, Kang & Waimey

(57) ABSTRACT

The present invention relates to a battery storage structure for acoustic equipment having a housing and a battery-driven speaker disposed on the housing, the battery storage structure for storing a battery in the housing. A case storage section is disposed in the housing and has an open surface. A battery case has an open surface and is stored within the case storage section, wherein the open surface of the battery case is oriented in the same direction as the open surface of the case storage section. At least one connection section connects the battery case and the case storage section, wherein a predetermined gap is formed between an inner bottom surface of the case storage section and an outer bottom surface of the battery case, and between an inner side surface of the case storage section and an outer side surface of the battery case.

12 Claims, 14 Drawing Sheets

(a)

(b)

BATTERY STORAGE STRUCTURE FOR ACOUSTIC EQUIPMENT

CROSS-REFERENCE TO RELATED APPLICATIONS

Pursuant to 35 U.S.C. §119(a), this application claims the benefit of earlier filing date and right of priority to Japanese Application No. 2009-222158, filed on Sep. 28, 2009, the contents of which are hereby incorporated by reference herein in their entirety.

FIELD OF THE INVENTION

The present invention relates to a battery storage structure for acoustic equipment, and in particular to battery storage structures in acoustic equipment that can reduce noise caused by vibration, as well as prevent contact failures between batteries and terminals, short-circuits and leakages in batteries.

BACKGROUND OF THE INVENTION

Numerous acoustic equipment, acoustic equipment equipped with a speaker and the like have been conventionally developed. For example, there previously exists a conventional radio receiver having a speaker stored inside a housing, and a battery storage section for storing batteries formed in a rear cabinet that constitutes a part of the housing.

However, in the conventional radio receiver described above, the speaker is stored inside the housing, so that when musical sound outputted from the speaker reaches a certain frequency, the housing is induced to resonate. In particular, in a device such as an amplifier equipped with a speaker, musical sounds outputted from the speaker are relatively loud, and therefore vibrations resulting from resonance are consequently large. Accordingly, a problem occurs in that the noise caused by resonance is harsh to a person's ear when the person listens to the musical sounds from the speaker. Furthermore, the resonance of the housing also causes batteries stored in the battery storage section to vibrate considerably. This results in problems such as contact failures between batteries and terminals that electrically connect circuits inside the housing, short circuits, battery leakages, and the like.

The present invention solves the problems described above by providing a battery storage structure for acoustic equipment that can reduce noise caused by vibration, as well as prevent contact failures between batteries and terminals, short-circuits of batteries and leakages in batteries.

SUMMARY OF THE INVENTION

The present invention is directed to a battery storage structure for acoustic equipment.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the present invention is embodied in a battery storage structure for acoustic equipment having a housing and a battery-driven speaker disposed on the housing, the battery storage structure for storing a battery in the housing and comprising a case storage section disposed in the housing and having an open surface, a battery case having an open surface and stored within the case storage section, wherein the open surface of the battery case is oriented in the same direction as the open surface of the case storage section, and at least one connection section connecting the battery case and the case storage section, wherein a predetermined gap is formed between an inner bottom surface of the case storage section and an outer bottom surface of the battery case, and between an inner side surface of the case storage section and an outer side surface of the battery case.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention. Features, elements, and aspects of the invention that are referenced by the same numerals in different figures represent the same, equivalent, or similar features, elements, or aspects in accordance with one or more embodiments.

DETAILED DESCRIPTION OF THE PREFERRED EMBODIMENTS

Figure 1:
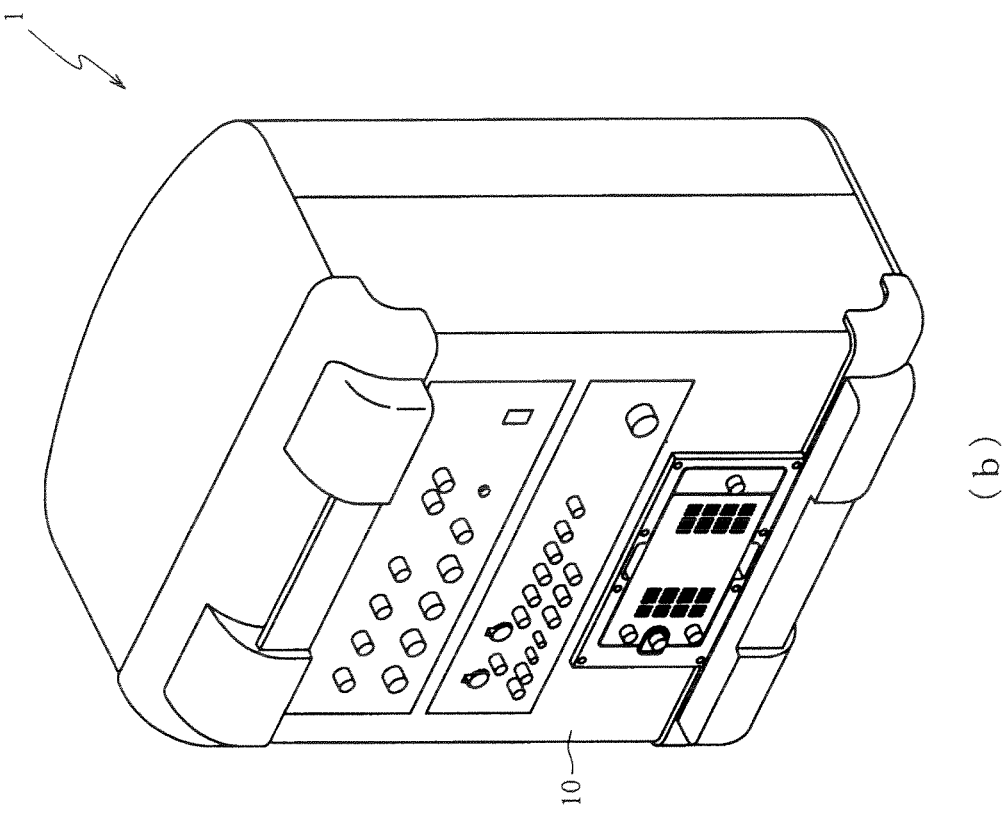
FIG. 1(a) is a front perspective view of an amplifier with a built-in speaker in accordance with one embodiment of the present invention.
FIG. 1(b) is a rear perspective view of an amplifier with built-in speaker in accordance with one embodiment of the present invention.
Figure 1:
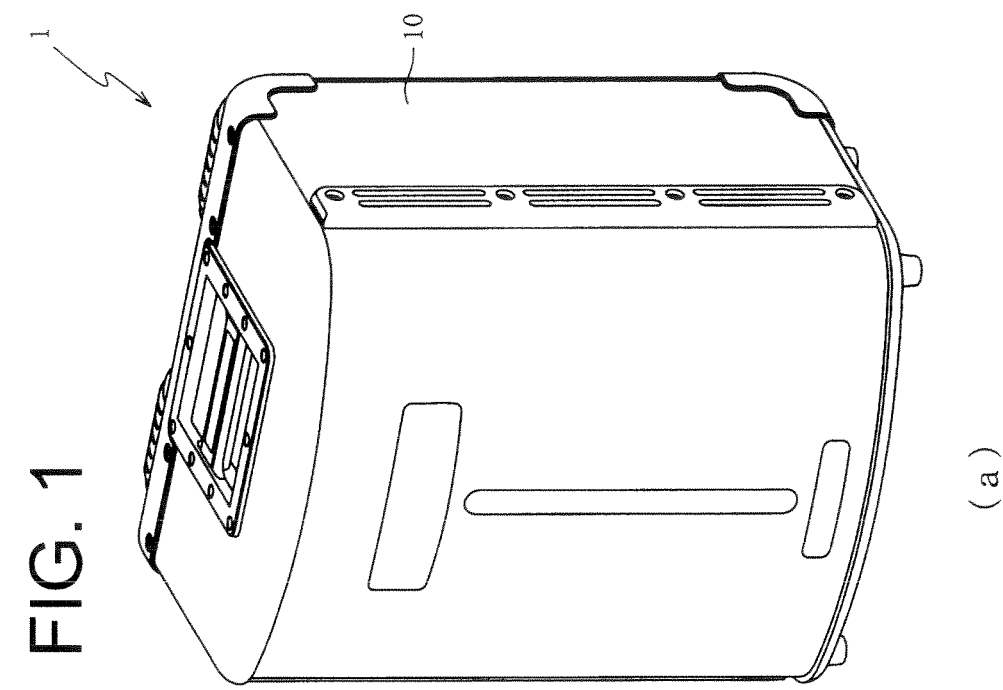
Figure 2:
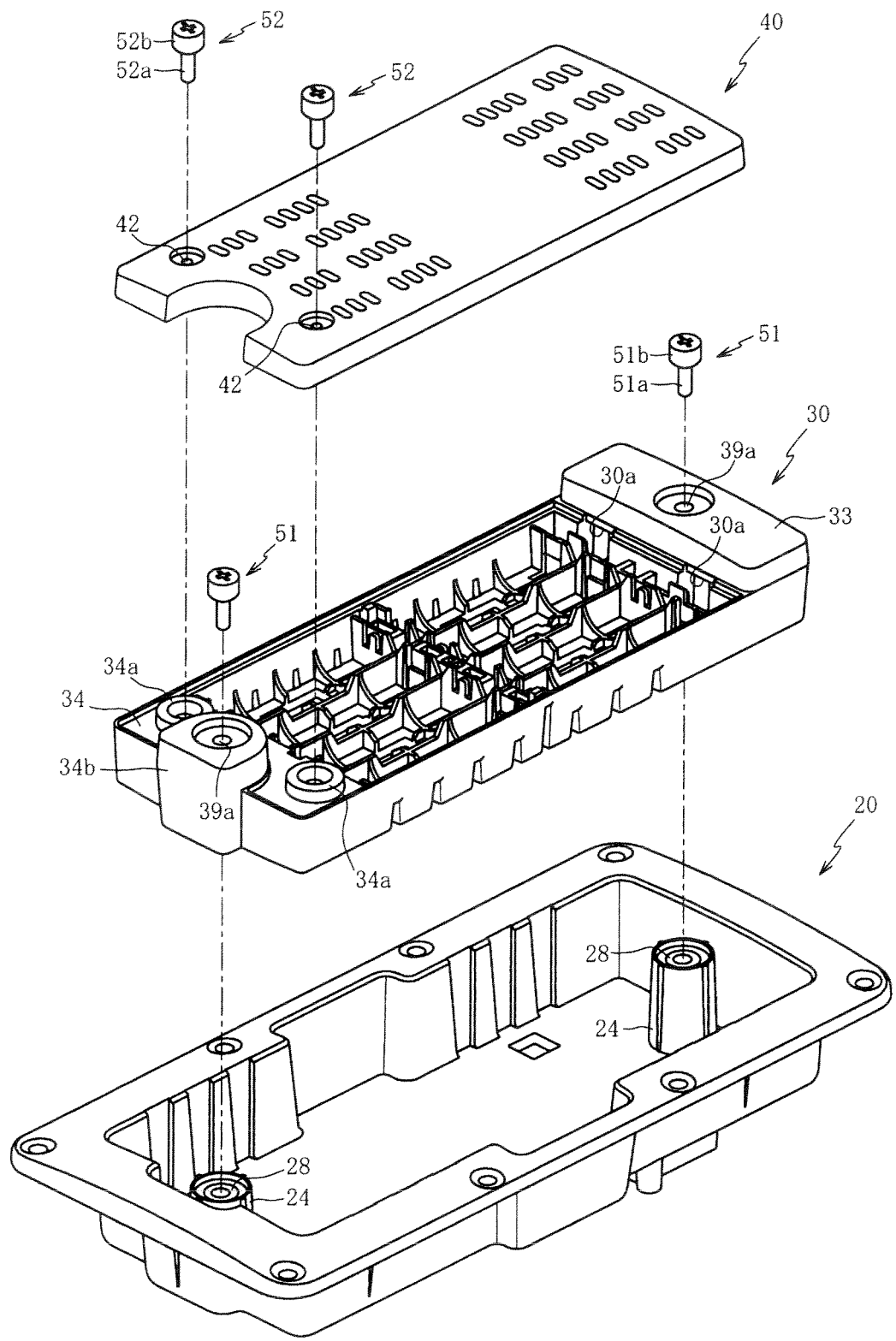
FIG. 2 is an exploded perspective view of a battery storage structure of an amplifier with a built-in speaker in accordance with one embodiment of the present invention.
Figure 3:
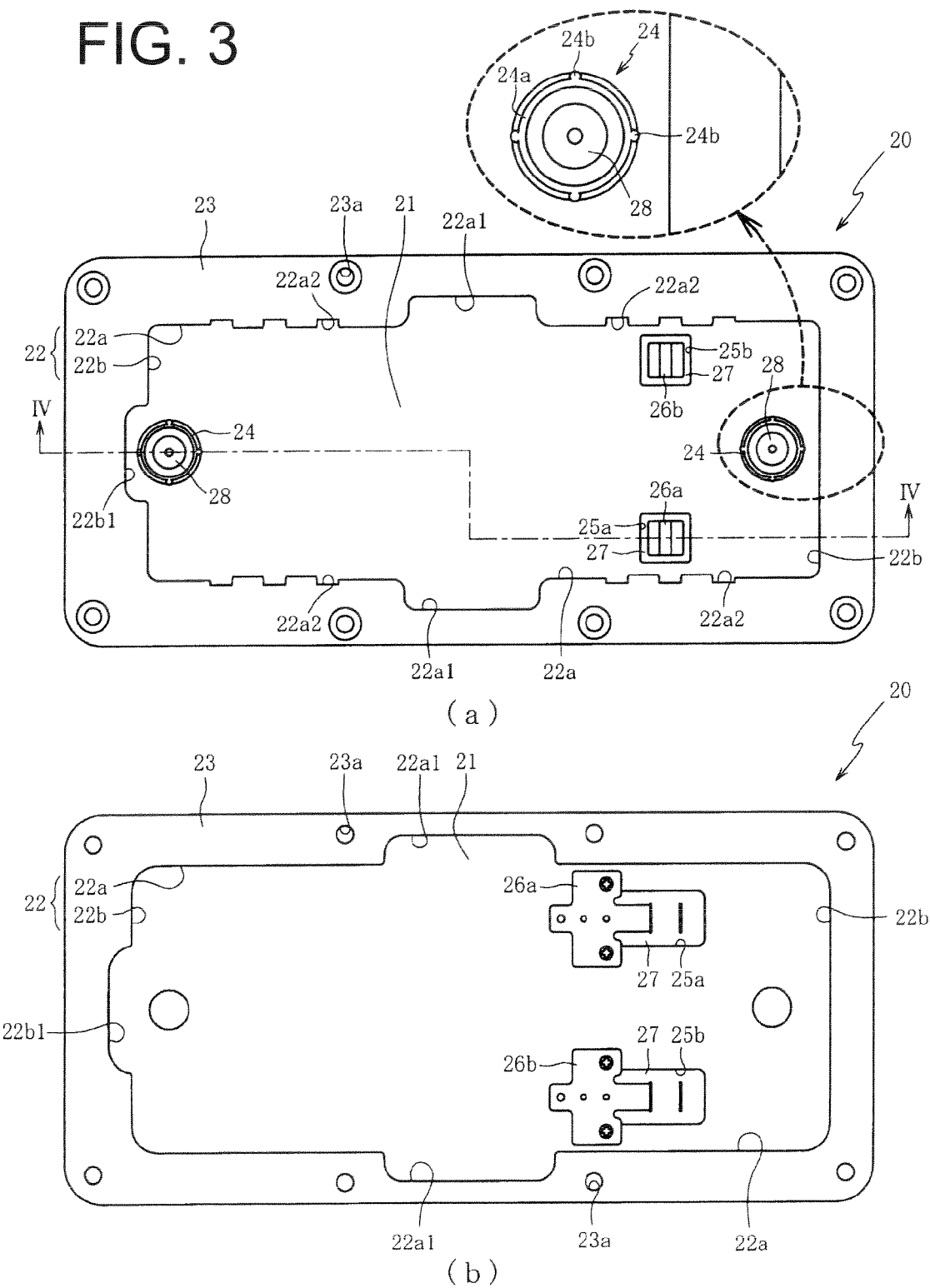
FIG. 3(a) is a top view of a case storage section in accordance with one embodiment of the present invention.
FIG. 3(b) is a bottom view of a case storage section in accordance with one embodiment of the present invention.
Figure 5:
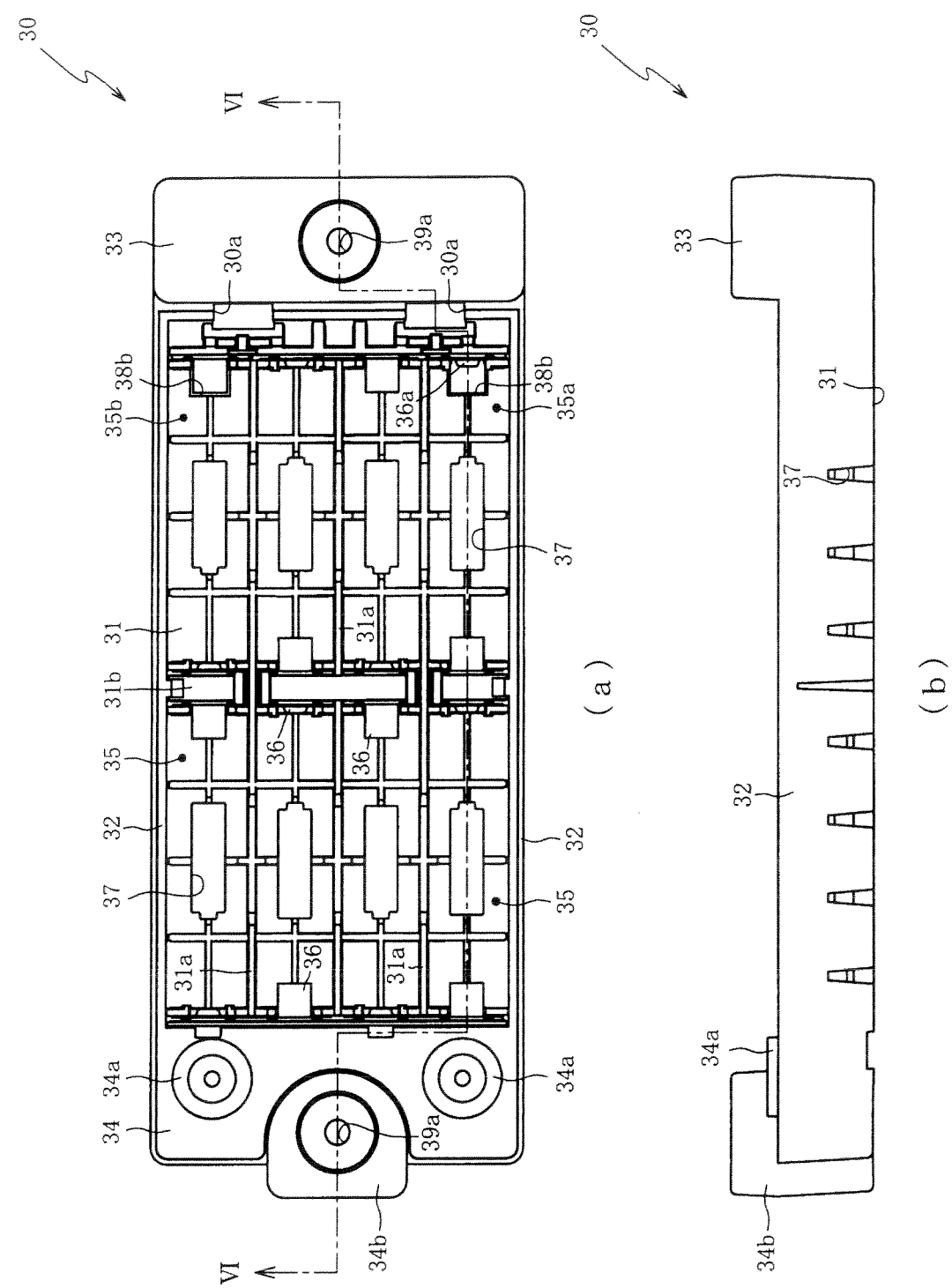
FIG. 5(a) is a top view of a battery case in accordance with one embodiment of the present invention.
FIG. 5(b) is a side view of a battery case in accordance with one embodiment of the present invention.

The present invention relates to a battery storage structure for acoustic equipment. Below, preferred embodiments of the present invention will be described with reference to the accompanying drawings. First, a battery storage structure of an amplifier with a built-in speaker 1 according to one embodiment of the invention will be described with reference to FIGS. 1 and 2. FIG. 1(a) is a front perspective view of an amplifier with a built-in speaker 1 according to one embodiment of the invention. FIG. 1(b) is a rear perspective view of an amplifier with a built-in speaker 1 according to one embodiment of the invention. FIG. 2 is an exploded perspective view of a battery storage structure of an amplifier with a built-in speaker 1. It is noted that, in FIG. 2, illustration of storage terminal plates 26a, 26b (as shown in FIG. 3) and case terminal plates 36 (as shown in FIG. 5) is omitted.

As shown in FIGS. 1(a) and 1(b), the amplifier with a built-in speaker 1 is acoustic equipment that uses an amplifier to amplify signals inputted from a sound source such as a musical instrument, microphone or the like, and outputs the amplified signals as musical sounds from a speaker. The amplifier 1 is structured to be driven by a battery.

As shown in FIG. 2, the amplifier with a built-in speaker 1 (see FIG. 1(b)) is equipped with a generally rectangular housing 10 (see FIG. 1(b)) with an amplifier and a speaker disposed in its interior, a generally rectangular case storage section 20 attached to the housing 10 and having an open surface, a generally rectangular battery case 30 having an open surface facing in the same direction as the open surface of the case storage section 20 as it is stored in the case storage section 20, and a cover section 40 that covers the open surface of the battery case 30. First screw members 51 tighten and fix the battery case 30 to the case storage section 20 in a freely detachable manner. Second screw members 52 tighten and fix the cover section 40 to the battery case 30 in a freely detachable manner. It is noted that the dimensions of the battery case 30 are set to form a gap 51 of a predetermined clearance (see FIG. 9) between inner side surfaces of the case storage section 20 and outer side surfaces of the battery case 30 when the battery case 30 is stored in the case storage section 20.

Each of the first screw members 51 and the second screw members 52 is provided with a rod-shaped male screw section 51a or 52a, respectively, threaded with a male thread on an outer circumferential surface. Each of the screw members 51 and the second screw members 52 is also provided with a head section 51b or 52b, respectively, disposed at one end of the male screw section 51a or 52a, respectively. The head sections 51b and 52b have a predetermined thickness.

A user can attach or remove the first screw members 51 or the second screw members 52 to/from a surface of the battery case 30, while gripping and turning an outer surface of the head section 51b or 52b. As a result, temporary tightening and removal of the first screw members 51 and the second screw members 52 is performed efficiently. Moreover, it is noted that the user may use a tool such as a screwdriver or the like on the head sections 51b or 52b to completely tighten or remove the first screw members 51 or the second screw members 52. Thus, the first screw members 51 or the second screw members 52 can be firmly tightened and fixed to the battery case 30. Alternatively, the user's fingers may also be used to tighten or remove the first screw members 51 and the second screw members 52.

Figure 4:
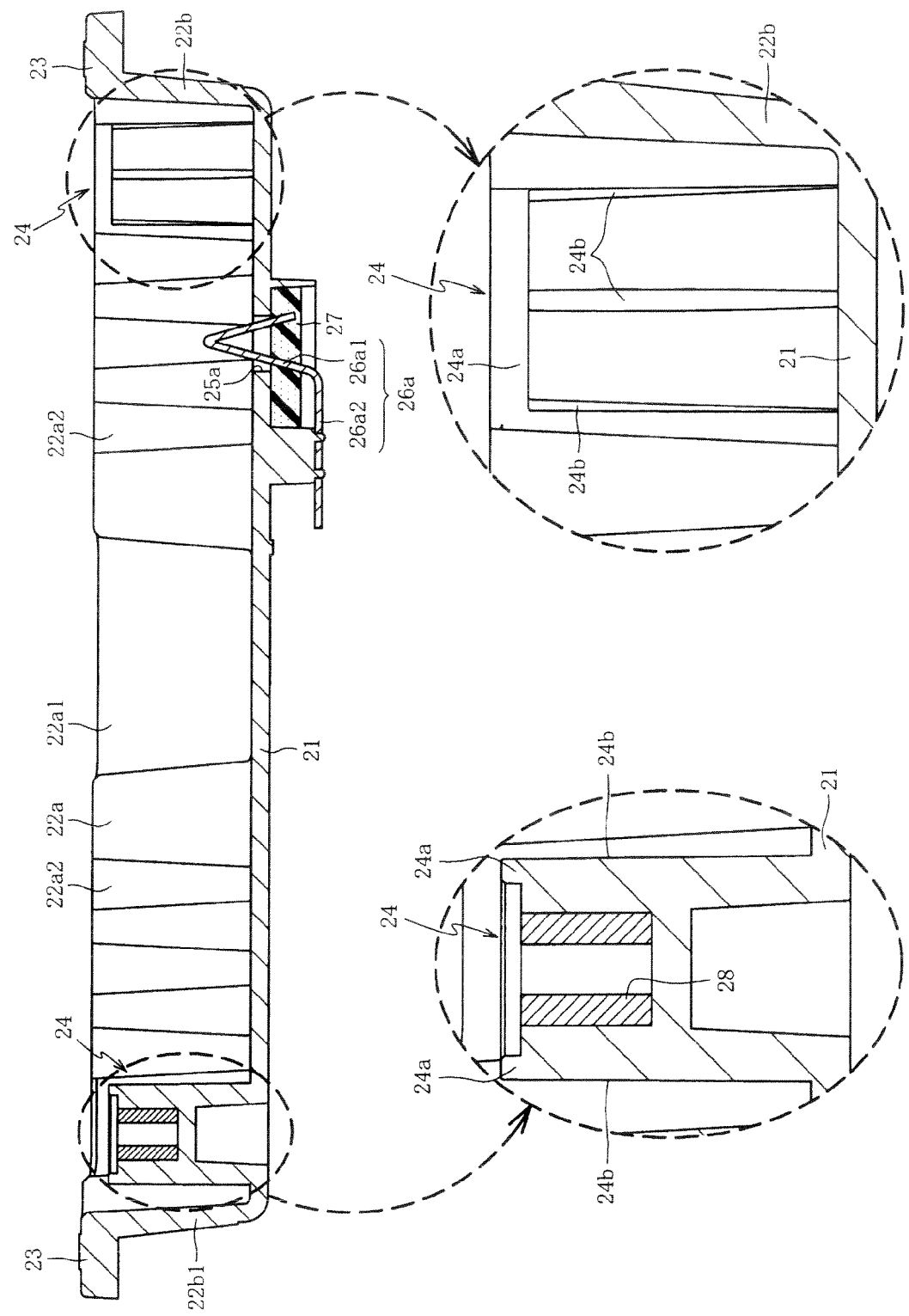
FIG. 4 is a cross-sectional view of a case storage section along line IV-IV of FIG. 3(a) in accordance with one embodiment of the present invention.

The case storage section 20 is described with reference to FIGS. 3 and 4. FIG. 3(a) is a top view of the case storage section 20. FIG. 3(b) is a bottom view of the case storage section 20. FIG. 4 is a cross-sectional view of the case storage section 20 along line IV-IV of FIG. 3(a).

As shown in FIG. 3(a), the case storage section 20 is a member for storing the battery case 30 and is formed in a generally rectangular shape having an open surface. The case storage section 20 comprises a rectangular storage bottom plate 21 forming a bottom of the case storage section 20 and four storage side walls 22 formed upright from outside edges of the storage bottom plate 21. An extension section 23 extends from end sections of the storage side walls 22 and towards outer side surfaces of the storage side walls 22 to form the opening of the case storage section 20. Screw holes 23a for screw-fastening the case storage section 20 to the housing 10 (see FIG. 1(b)) are bored in a plurality of locations in the extension 23.

Of the four storage side walls 22, each of two first storage side walls 22a formed upright at opposite edges in a width direction (vertical direction in FIG. 3(a)) of the storage bottom plate 21 is provided with a first concave section 22a1 recessing in an inner side surface of the first storage side wall 22a. A plurality of groove sections 22a2 are provided to recess in the inner side surface of the first storage side wall 22a, wherein a recess depth of the groove sections 22a2 from the inner side surface of the first storage side wall 22a is smaller than a recess depth of the first concave section 22a1 from the inner side surface of the first storage side wall 22a.

In addition, of the four storage side walls 22, one of two second storage side walls 22b formed upright at opposite edges in a longitudinal direction (horizontal direction in FIG. 3(a)) of the storage bottom plate 21 is provided with a second concave section 22b1 recessing in an inner side surface of the second storage side wall 22b. The first concave sections 22a1, the groove sections 22a2 and the second concave section 22b1 extend from a connecting portion between the storage bottom plate 21 and the storage side walls 22 towards a side surface of the case storage section 20 (see FIG. 4).

As shown in FIGS. 3(a) and 3(b), the storage bottom plate 21 is provided with convex sections 24 disposed on either side of the storage bottom plate 21 in the longitudinal direction. Two storage terminal holes 25a and 25b are bored on one side (right side in FIG. 3(a)) of the storage bottom plate 21 and arranged side by side in the width direction (vertical direction in FIG. 3(a)) of the storage bottom plate 21. Storage terminal plates 26a and 26b are provided to penetrate the storage terminal holes 25a and 25b. Sponge-like closing members 27 close the storage terminal holes 25a and 25b and restrict air flow between the case storage section 20 and the interior of the housing 10 (see FIG. 1(b)).

As shown in FIG. 4, the convex sections 24 are hollow cone-shaped portions that project from the inner bottom surface of the storage bottom plate 21 towards the side surface (upper side in FIG. 4) of the case storage section 20. The convex sections 24 are internally fitted with first nut members 28 threaded with female threads to be screwed with the first screw members 51 (see FIG. 2). Because the convex sections 24 are formed hollow, variations in plate thickness of the case storage section 20 is avoided, thus preventing molding failure when molding the case storage section 20.

Furthermore, each of the convex sections 24 is provided with a projection section 24a that projects from an end surface circumferential portion of a convex end of the convex section 24 in a projecting direction (upward direction in FIG. 4) of the convex section 24. The projection section 24a is formed in a circular ring shape when viewed from an end surface side of the convex end of the convex section 24. Protruding ribs 24b that project from an outer side surface of the convex section 24 extend along the convex direction of the convex section 24. The end surface of the projection section 24a may be formed so that its area is smaller than an area of the end surface of the convex end of the convex section 24. According to the present embodiment, four ribs 24b are formed on each convex section 24.

The storage terminal plates 26a and 26b are members for electrically connecting electrical circuits inside the amplifier with a built-in speaker 1 (see FIG. 1(b)) with batteries 2 (see FIG. 11) stored in the battery case 30 (see FIG. 2). The storage terminal plates 26a and 26b are provided with bent plates 26a1 and 26b1, respectively, that constitute one side (right side in FIG. 4) of the storage terminal plates 26a and 26b and are generally bent in a V-shape when viewed from the front, and flat-shaped flat plates 26a2 and 26b2, respectively, that constitute the other side (left side in FIG. 4) of the storage terminal plates 26a and 26b. In the storage terminal plates 26a and 26b, the bent plates 26a1 and 26b1 are provided to penetrate the storage terminal holes 25a and 25b, respectively, and the tip of their bend projects from the inner bottom surface of the storage bottom plate 21. The flat plates 26a2 and 26b2, respectively, are screw-fastened to an outer bottom surface of the storage bottom plate 21.

Figure 6:
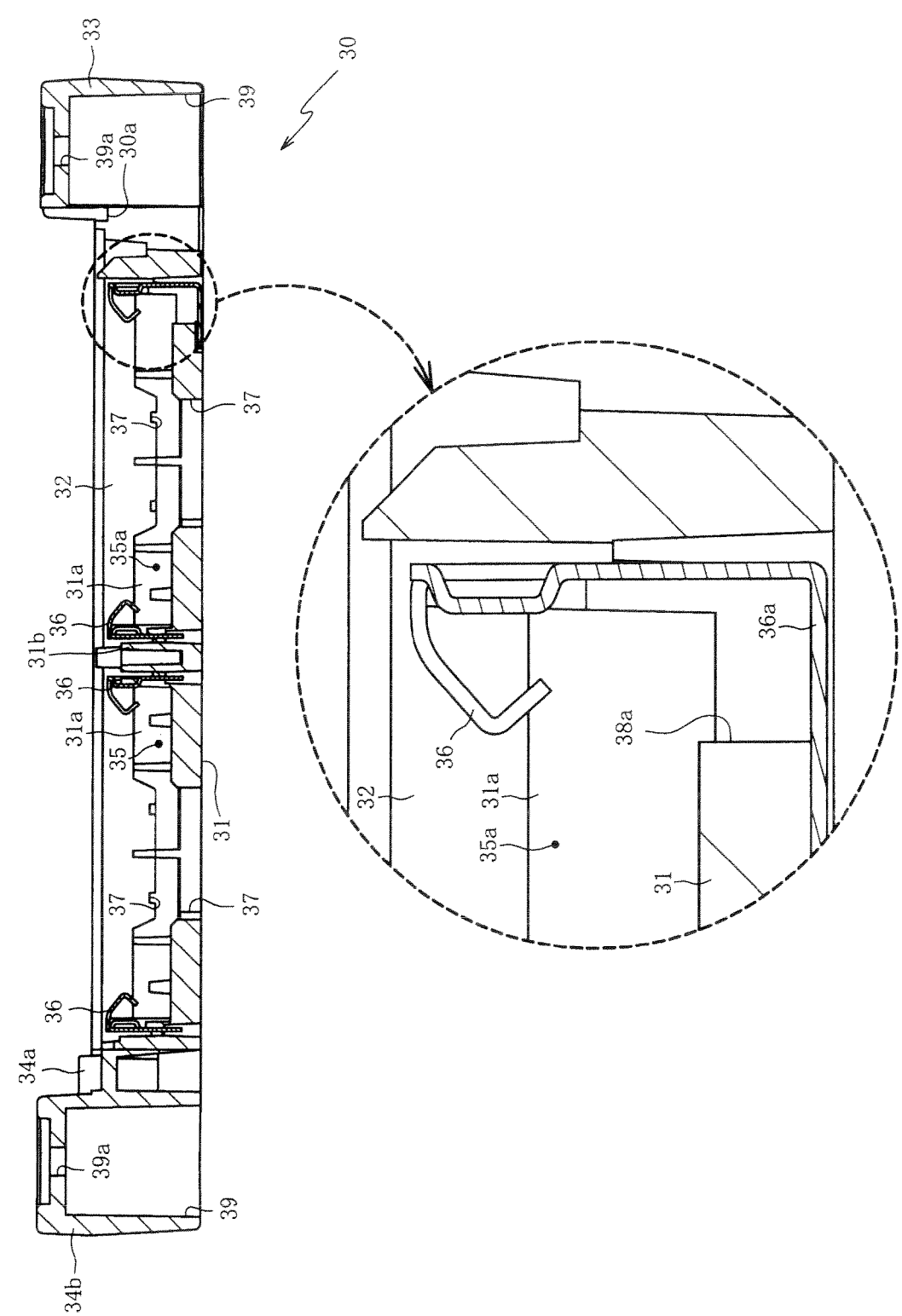
FIG. 6 is a cross-sectional view of a battery case along line VI-VI of FIG. 5(a) in accordance with one embodiment of the present invention.

A structure of the battery case 30 is described with reference to FIGS. 5 and 6. FIG. 5(a) is a top view of the battery case 30. FIG. 5(b) is a side view of the battery case 30. FIG. 6 is a cross-sectional view of the battery case 30 along line VI-VI of FIG. 5(a).

Figure 11:
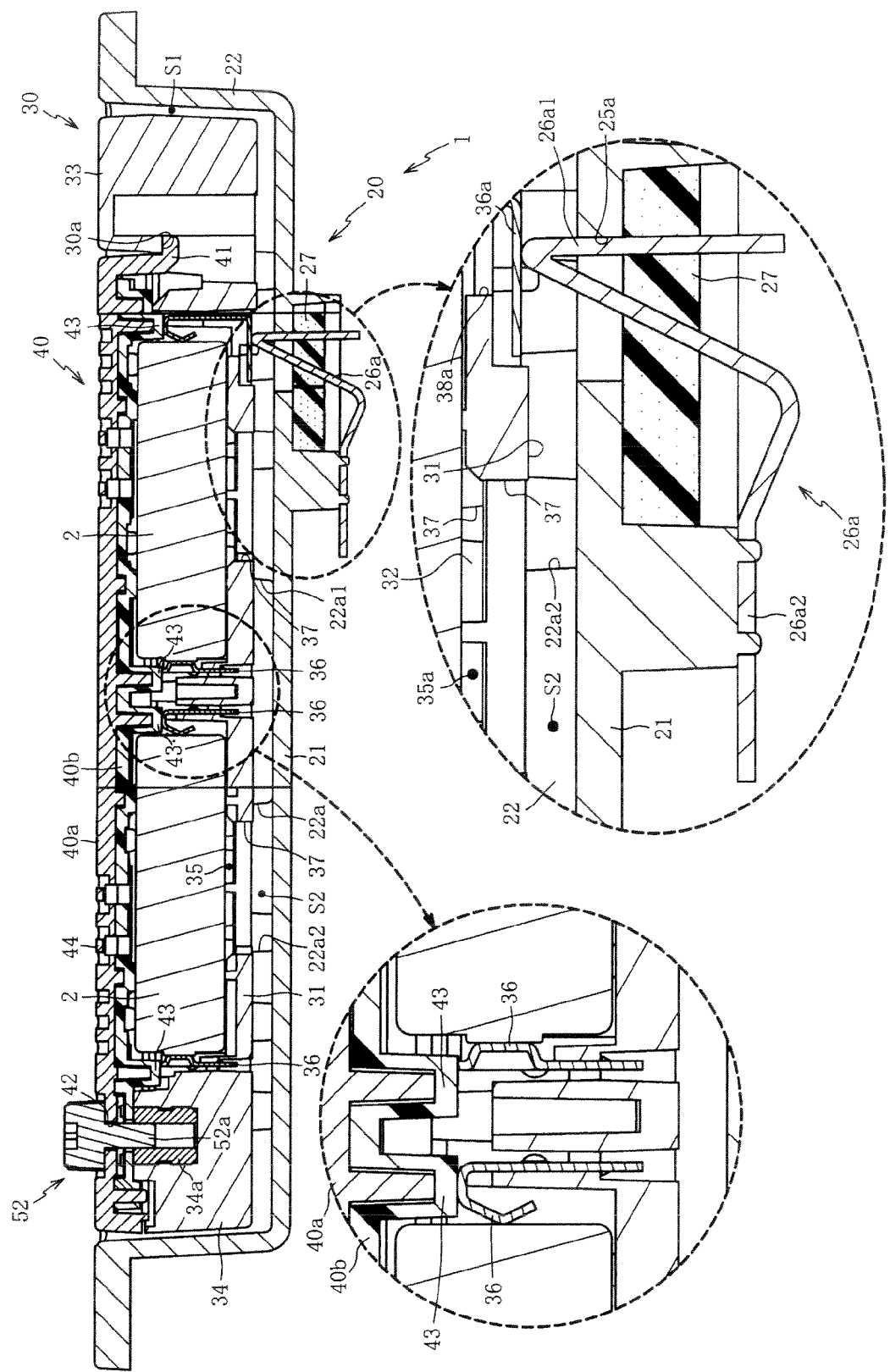
FIG. 11 is a cross-sectional view of a battery storage structure of an amplifier with a built-in speaker along line XI-XI of FIG. 9 in accordance with one embodiment of the present invention.

As shown in FIG. 5(a), the battery case 30 is a member for storing the batteries 2 (see FIG. 11). The battery case 30 is formed in a generally rectangular shape having an open surface, and comprises a rectangular case bottom plate 31 that forms the bottom of the battery case 30 and two case side walls 32 formed upright on opposite edges in the width direction (vertical direction in FIG. 5(a)) of the case bottom plate 31. A first fixing section 33 is connected on an outside edge on one side of the case bottom plate 31 in the longitudinal direction (right side of FIG. 5(a)), and a second fixing section 34 is connected on an outside edge on the other side of the case bottom plate 31 in the longitudinal direction (left side of FIG. 5(a)). Additionally, cover locking sections 30a, to which engaging tab sections 41 (see FIG. 8(a)) described below engage, are formed in the connecting portion between the case bottom plate 31 and the first fixing section 33.

As shown in FIGS. 5(a) and 5(b), the battery case 30 is equipped with eight battery chambers 35 formed in a manner to store batteries 2 by the case bottom plate 31. Three partitioning plates 31a are formed upright on the case bottom plate 31 along the longitudinal direction (horizontal direction in FIG. 5(a)) of the case bottom plate 31. A partition wall 31b is formed upright on the case bottom plate 31 at a central portion of the case bottom plate 31 in the width direction (vertical direction in FIG. 5(a)). Case terminal plates 36 come into contact with a positive terminal or negative terminal of the batteries 2 when the batteries 2 are stored in the battery chambers 35. Case heat dissipation holes 37 are bored in the case bottom plate 31 and the case side walls 32. The case heat dissipation holes 37 may be formed to imitate the shape of the batteries 2, and indicate the proper orientation of the batteries 2 when the batteries 2 are stored in the battery chambers 35.

In the case bottom plate 31, case terminal holes 38a and 38b, which are generally rectangular in a plan view, are bored in portions constituting connection battery chambers 35a and 35b. The connection battery chambers 35a and 35b are battery chambers 35 formed at one side of the battery case 30 in the longitudinal direction (right side of FIG. 5(a)), and are each located at opposite ends of the battery case 30 in the width direction (top end side and bottom end side in FIG. 5(a)).

The first fixing section 33 is formed to project in the height direction (upward in FIG. 5(b)) beyond the case side walls 32 by a height equivalent to the plate thickness of the cover section 40 (see FIG. 2). The second fixing section 34 is equipped with second nut members 34a that are internally fitted on either side in the width direction (vertical direction in FIG. 5(a)) of the battery case 30 and threaded with female threads to be screwed with the second screw members 52 (see FIG. 2). A case protruding section 34b projects from one side of the battery case 30 in the longitudinal direction (left side in FIG. 5(b)) and projects in the height direction beyond the case side walls 32 by a height equivalent to the plate thickness of the cover section 40. Accordingly, the first fixing section 33 and the case protruding section 34b have an equivalent height.

As shown in FIG. 6, the first fixing section 33 and the case protruding section 34b are each equipped with a concave section 39 respectively recessing in an outer bottom surface of the first fixing section 33 and the case protruding section 34b towards a side surface (upper side in FIG. 6) of the battery case 30. Each of the concave sections 39 is provided with a case insertion hole 39a that is bored from a concave base of the concave section 39 towards one side of the first fixing section 33 (upper side in FIG. 6) or one side of the case protruding section 34b (upper side in FIG. 6). The male screw section 51a of the first screw member 51 (see FIG. 2) can be inserted into the case insertion hole 39a.

The dimensions of the concave sections 39 allow a gap S3 (see FIG. 10) of a predetermined clearance to be formed between the ribs 24b (see FIG. 4) formed on the outer side surface of the convex sections 24 and an inner side surface of the concave sections 39 when the convex sections 24 (see FIG. 4) are loosely inserted into the concave sections 39. The concave sections 39 are additionally formed in such a manner that the recess depth from the outer bottom surface of the first fixing section 33 or the outer bottom surface of the case protruding section 34b is smaller than the projection height of the convex sections 24 from the inner bottom surface of the storage bottom plate 21 (see FIG. 4). Furthermore, the difference between the recess depth of the concave sections 39 from the outer bottom surface of the first fixing section 33 or the outer bottom surface of the case protruding section 34b and the projection height of the convex sections 24 from the inner bottom surface of the storage bottom plate 21 is smaller than the projection height of the bent plates 26a1 and 26b1 (see FIG. 4) from the inner bottom surface of the storage bottom plate 21.

The case terminal plates 36 are members for electrically connecting the batteries 2 to the amplifier with a built-in speaker 1 (see FIG. 1(b)) through the case storage section 20 (see FIG. 2), and are disposed at either end sides in the longitudinal direction (horizontal direction in FIG. 6(a)) of the battery chambers 35. Of the case terminal plates 36, connection case terminal plates 36a and 36b disposed on one end side (right end side in FIG. 6) of the connection battery chambers 35a and 35b close the case terminal holes 38a and 38b and are fixed to the outer bottom surface of the case bottom plate 31.

It is noted that the case terminal holes 38a and 38b are positioned to oppose the storage terminal holes 25a and 25b (see FIG. 3(a)), respectively, when the battery case 30 is stored in the case storage section 20. Further, the case terminal plates 36 are disposed in the battery case 30 in such a manner as to have all batteries 2 and all case terminal plates 36 become electrically connected by having the batteries 2 stored in all of the battery chambers 35.

Figure 7:
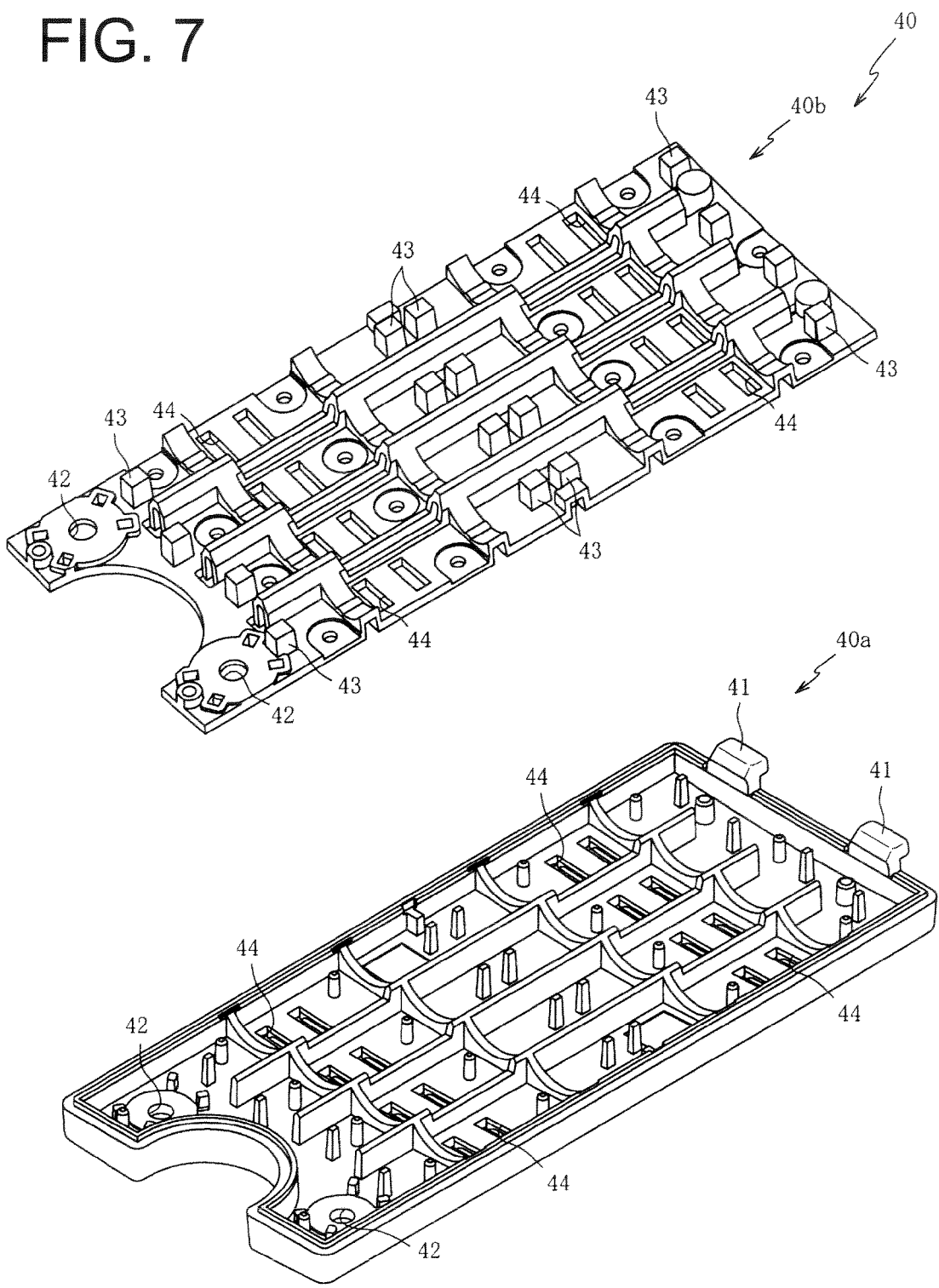
FIG. 7 is an exploded perspective view of a cover section in accordance with one embodiment of the present invention.
Figure 8:
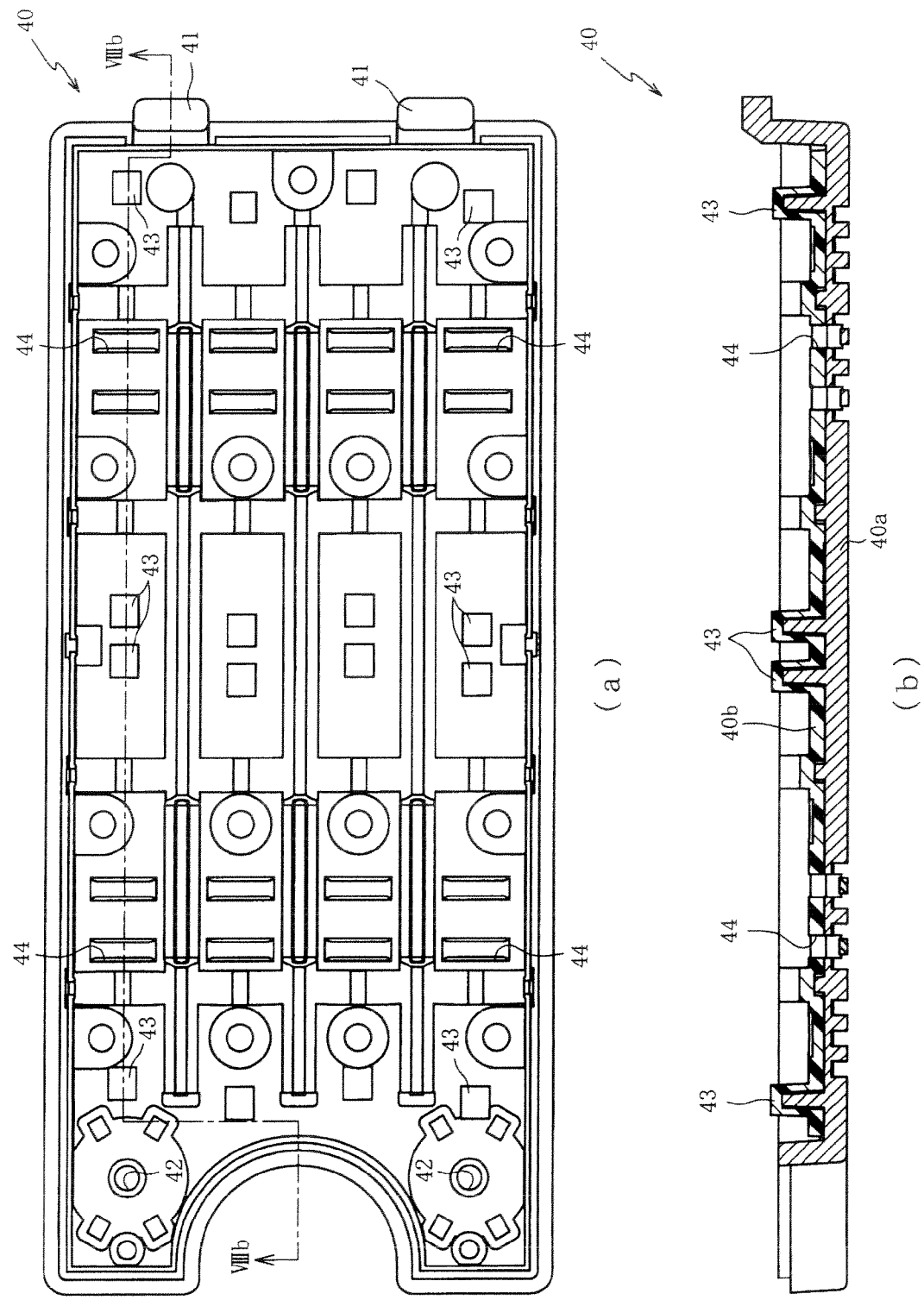
FIG. 8(a) is a back surface view of a cover section in accordance with one embodiment of the present invention.
FIG. 8(b) is a cross-sectional view of a cover section along line VIIIb-VIIIb of FIG. 8(a) in accordance with one embodiment of the present invention.

A detailed structure of the cover section 40 is described with reference to FIGS. 7 and 8. FIG. 7 is an exploded perspective view of the cover section 40. FIG. 8(a) is a back surface view of the cover section 40. FIG. 8(b) is a cross-sectional view of the cover section 40 along line VIIIb-VIIIb of FIG. 8(a).

As shown in FIG. 7, the cover section 40 is a plate-shaped member that prevents the batteries 2 (see FIG. 11) stored in the battery case 30 (see FIG. 2) from falling out of the battery case 30. The cover section 40 comprises a main body section 40a comprising a resin material such as ABS resin or the like and an elastic section 40b comprising an elastic material such as elastomer or the like, and is structured as one piece by joining the main body section 40a and the elastic section 40b.

As shown in FIGS. 8(a) and 8(b), the cover section 40 is provided with the engaging tab sections 41 that project outward (to the right in FIG. 8(a)) from an end section on one side of the main body section 40a in the longitudinal direction (right side in FIG. 8(a)). Cover insertion holes 42 are bored on the other side of the main body section 40a and the elastic section 40b in the longitudinal direction (left side in FIG. 8(b)). Male screw sections 52a (see FIG. 2) of the second screw members 52 can be inserted into the cover insertion holes 42. Cover protruding sections 43 are formed on the elastic section 40b and project from the side (upper side in FIG. 8(a)) where the elastic section 40b is joined. Cover heat dissipation holes 44 are bored in the main body section 40a and the elastic section 40b.

The thickness of the elastic section 40b is set to the extent that the elastic section 40b and the batteries 2 are mutually abutted against one another when the side surface (upper side in FIG. 6) of the battery case 30 is closed by the cover section 40 with the elastic section 40b to be connected facing toward the battery case 30 (see FIG. 6). Furthermore, the projection height of the cover protruding sections 43 from the bottom surface of the main body section 40a on the reverse side of the surface where the elastic section 40b and the main body section 40a are joined (upper side in FIG. 8(b)) is set to a height with which the cover protruding sections 43 and the case terminal plates 36 (see FIG. 6) are mutually abutted against one another when the side surface (upper side in FIG. 6) of the battery case 30 is closed by the cover section 40 with the elastic section 40b to be connected facing toward the battery case 30.

Figure 9:
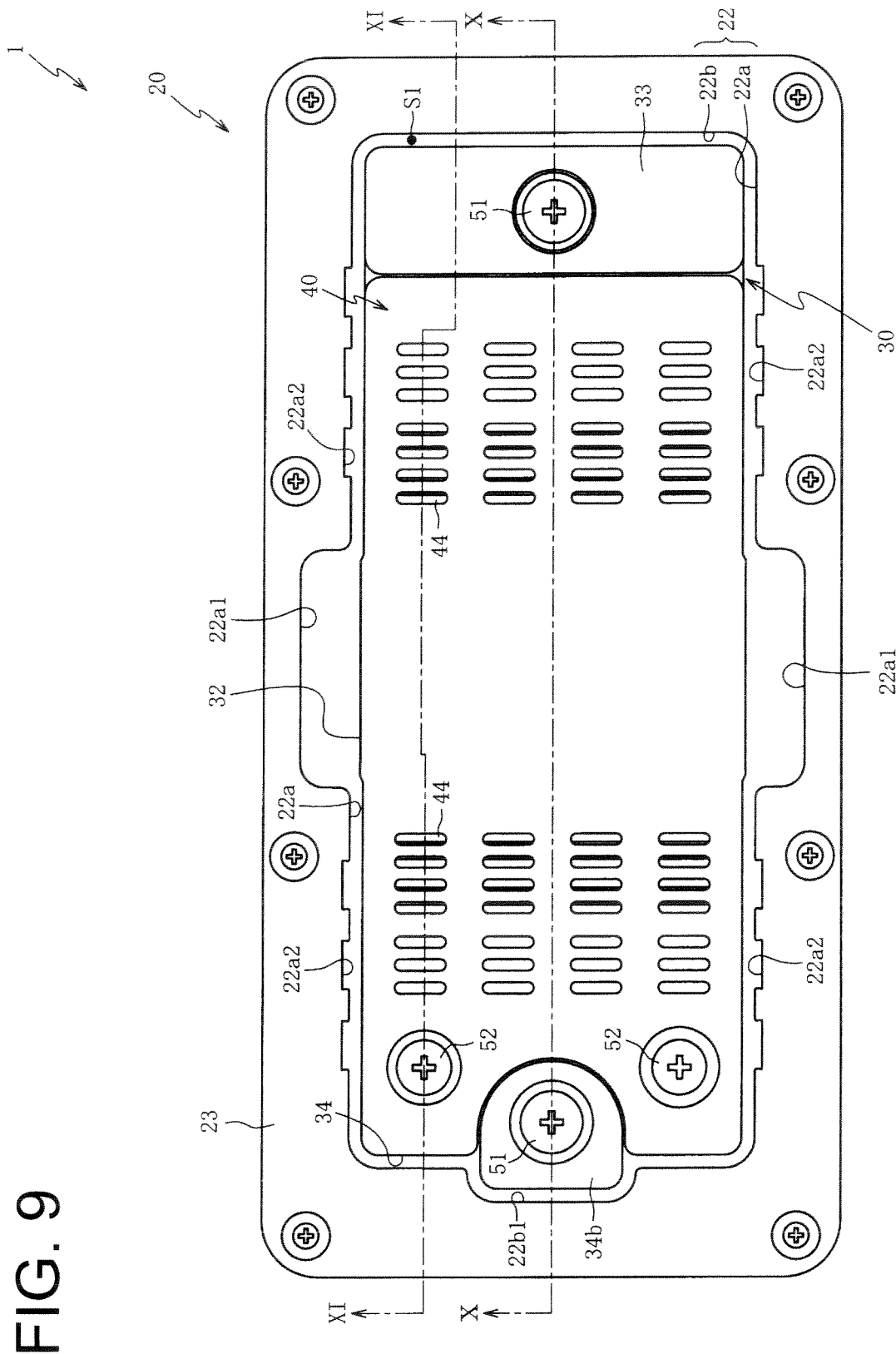
FIG. 9 is a top view of a battery storage structure of an amplifier with a built-in speaker in accordance with one embodiment of the present invention.
Figure 10:
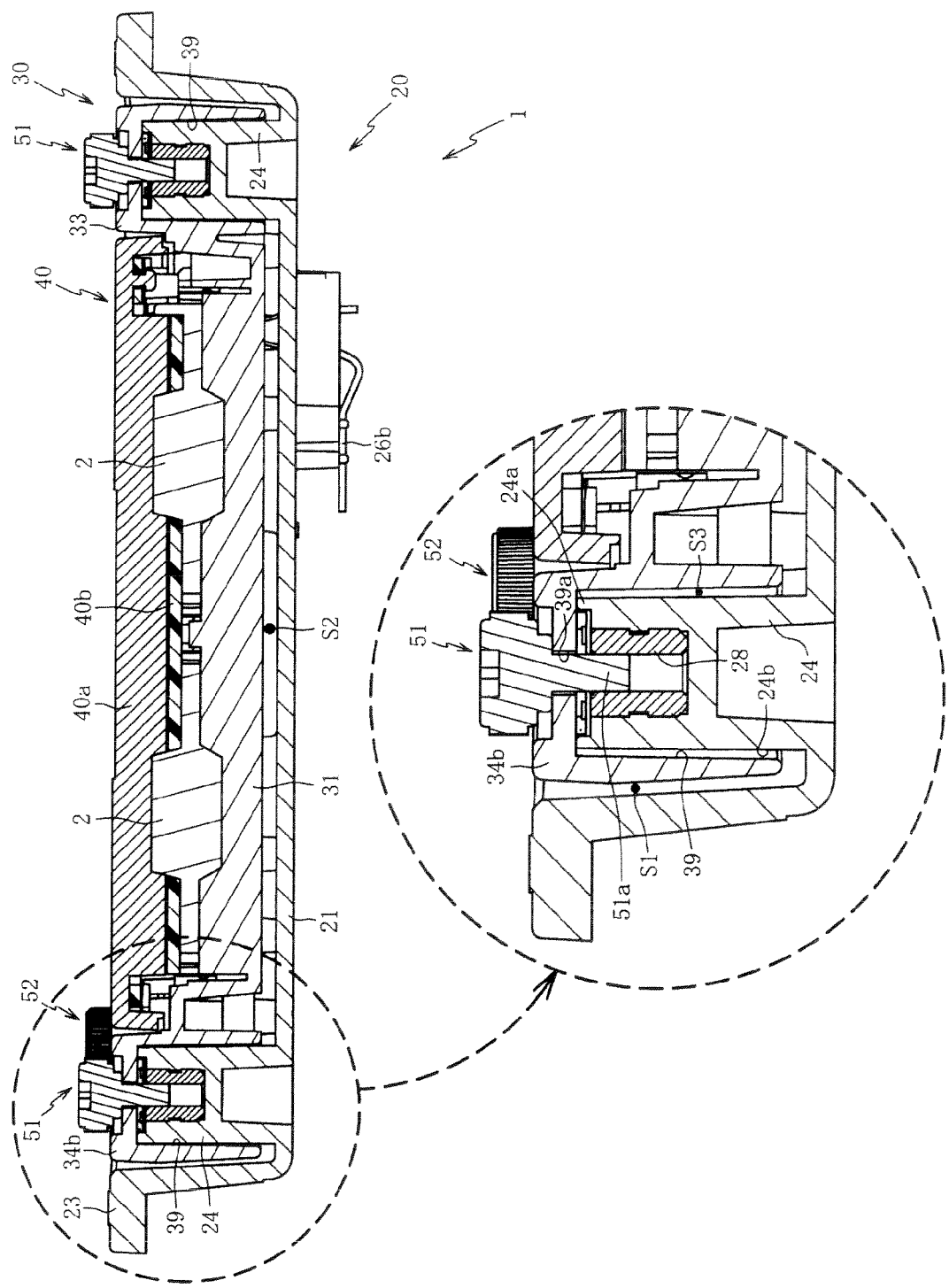
FIG. 10 is a cross-sectional view of a battery storage structure of an amplifier with a built-in speaker along line X-X of FIG. 9 in accordance with one embodiment of the present invention.

Usage status of the battery storage structure of the amplifier with a built-in speaker 1 (see FIG. 1(b)) is described with reference to FIGS. 9 to 11. FIG. 9 is a top view of the battery storage structure of the amplifier with a built-in speaker 1. FIG. 10 is a cross-sectional view of the battery storage structure of the amplifier with a built-in speaker 1 along line X-X of FIG. 9. FIG. 11 is a cross-sectional view of the battery storage structure of the amplifier with a built-in speaker 1 along line XI-XI of FIG. 9. It is noted that in FIGS. 9 to 11, illustration of the housing 10 is omitted.

As shown in FIG. 9, the case storage section 20 is mounted on the housing 10 (see FIG. 1(b)) by fastening screws into the eight screw holes 23a (see FIG. 3(a)) formed in the extension section 23. On the battery case 30, the case protruding section 34b projects on one side of the battery case 30 in the longitudinal direction (left side in FIG. 9) of the battery case 30. On the case storage section 20, the second concave section 22b1 is provided to recess in the second storage side wall 22b on the one side in the longitudinal direction (left side in FIG. 9). Consequently, by directing the side where the case protruding section 34b is formed on the battery case 30 toward one direction (left side in FIG. 9), the battery case 30 can be stored in the case storage section 20. This prevents storing the battery case 30 in the case storage section 20 in a wrong orientation.

Further, because the first concave section 22a1 is provided to recess in each of the two storage side walls 22a in the case storage section 20, the battery case 30 can be attached or detached by inserting fingers in the first concave sections 22a1 when the battery case 30 is attached to or detached from the case storage section 20. This consequently makes it possible to efficiently perform operations to attach and detach the battery case 30 to and from the case storage section 20.

If musical sounds outputted from the speaker disposed inside the housing 10 reach a specific frequency, the housing 10 resonates. Accordingly, the case storage section 20 vibrates as a result of the resonance of the housing 10 because the case storage section 20 is screw-fastened to the housing 10. To counter this, when the battery case 30 is stored in the case storage section 20, the gap S1 of a predetermined clearance is formed between the inner side surfaces of the case storage section 20 and the outer side surfaces of the battery case 30. That is, a gap S1 is formed between the inner side surfaces of the storage side walls 22 and the outer side surfaces of the case side walls 32, the first fixing section 33, the second fixing section 34, and the case protruding section 34b. Consequently, even when the case storage section 20 vibrates due to the resonance of the housing 10, the vibration of the case storage section 20 can be averted from being transmitted from the inner side surfaces of the storage side walls 22 to the outer side surfaces of the case side walls 32, the first fixing section 33, the second fixing section 34, and the case protruding section 34b.

As shown in FIG. 10, to store the battery case 30 into the case storage section 20, the concave sections 39 formed on either side of the battery case 30 in the longitudinal direction (left and right sides in FIG. 10) is loosely fitted onto the convex sections 24 formed on the first fixing section 33 and the case protruding section 34b of the case storage section 20. Consequently, the concave sections 39 are guided by the convex sections 24 so that the battery case 30 is disposed in a proper position in the case storage section 20.

After the battery case 30 is stored in the case storage section 20, the male screw sections 51a of the first screw members 51 may be inserted into the case insertion holes 39a bored in the concave sections 39, while also being screwed into the first nut members 28 internally fitted into the convex sections 24. Accordingly, the battery case 30 is mounted in the case storage section 20 in a freely detachable manner.

As a result, if the batteries 2 are drained while the amplifier with a built-in speaker 1 is driven on the batteries 2, for example, the battery case 30 mounted in the case storage section 20 can be replaced with a spare battery case 30 in which the batteries 2 have been stored in advance. Accordingly, a more efficient operation of replacing the batteries 2 is provided as opposed to replacing the plurality of batteries 2 individually. Furthermore, the length of time the power source to the amplifier with a built-in speaker 1 is unavailable is shortened even when battery replacement is required while driving the amplifier with a built-in speaker 1 on the batteries 2.

In addition, since the battery case 30 is mounted in the case storage section 20 in a freely detachable manner, noise generation due to the vibration of the battery case 30 is avoided by removing the battery case 30 when driving the amplifier with a built-in speaker 1 on an alternating-current (AC) power source.

In the concave sections 39, the recess depth from the outer bottom surface of the first fixing section 33 or the outer bottom surface of the case protruding section 34b is smaller than the projection height of the convex sections 24 from the inner bottom surface of the storage bottom plate 21. Thus, when the battery case 30 is stored in the case storage section 20, a gap S2 with a predetermined clearance is formed between the inner bottom surface of the case storage section 20 and the outer bottom surface of the battery case 30, that is, between the inner bottom surface of the storage bottom plate 21 and the outer bottom surface of the case bottom plate 31. As a result, transmission of the vibration of the case storage section 20 associated with the resonance of the housing 10 from the inner bottom surface of the storage bottom plate 21 to the outer bottom surface of the case bottom plate 31 is averted.

Furthermore, since the projection sections 24a that project from the end surface of the convex end of the convex sections 24 are formed on the convex sections 24, the end surface of the protruding sections 24a are made to abut the concave base of the concave sections 39 when the concave sections 39 are fitted onto the convex sections 24. Consequently, the area of contact between the convex sections 24 and the concave sections 39 are made smaller than a situation where an entire end surface of the convex end of the convex sections 24 abuts the concave base of the concave sections 39. As a result, transmission of the vibration of the case storage section 20 to the battery case 30 is firmly restricted.

The gap S3 of a predetermined clearance is formed between the ribs 24b formed on the outer side surface of the convex sections 24 and the inner side surface of the concave sections 39 when the battery case 30 is stored in the case storage section 20. This restricts the transmission of the vibration of the case storage section 20 from the outer side surface of the convex sections 24 to the inner side surface of the concave sections 39. In particular, since four ribs 24b are formed on the outer side surface of each of the convex sections 24 (see FIG. 4), the ribs 24b are made to come into contact with the inner side surface of the concave sections 39 when the convex sections 24 and the concave sections 39 come into contact due to the vibration of the case storage section 20 or the battery case 30.

Accordingly, the area of contact when the convex sections 24 and the concave sections 39 come into contact is smaller compared to a situation where the outer side surface of the convex sections 24 and the inner side surface of the concave sections 39 come into contact. Therefore, the vibration transmitted from the case storage section 20 to the battery case 30 is reduced. In the meantime, the ribs 24b are provided to extend (see FIG. 4) along the convex direction of the convex sections 24 (vertical direction in FIG. 10) so that impeding the effect of the convex sections 24 guiding the concave sections 39 is averted.

As described above, because the battery case 30 is tightened and fixed by the first screw members 51, the area of contact between the convex sections 24 and the concave sections 39 can be made small, while at the same time securely fixing the convex sections 24 with the concave sections 39. Consequently, the vibration of the battery case 30 associated with the vibration of the case storage section 20 is restricted.

In this manner, transmission of the vibration of the case storage section 20 due to the resonance of the housing 10 to the battery case 30 is suppressed so that noise generation caused by the vibration of the battery case 30 is reduced. This also prevents any noise caused by the resonance of the housing 10 from becoming grating to the ear when one listens to musical sounds from the speaker. Furthermore, suppression of the vibration of the battery case 30 leads to suppression of contact failures or short-circuits between the batteries 2 stored in the battery case 30 and the case terminal plates 36 (see FIG. 11), as well as leakages of the batteries 2.

As shown in FIG. 11, a plurality of the case heat dissipation holes 37 are formed in the battery chambers 35 in which the batteries 2 are stored, while the cover heat dissipation holes 44 are formed in the cover section 40. Consequently, the heat generated from the batteries 2 when the amplifier with a built-in speaker 1 (see FIG. 1) is battery-driven can be released to the outside of the battery case 30 through the case heat dissipation holes 37 and the cover heat dissipation holes 44. Further, when the battery case 30 is stored in the case storage section 20, the storage bottom plate 21 and the storage side walls 22 are disposed in positions opposing each of the case heat dissipation holes 37. This allows the storage bottom plate 21 and the storage side walls 22 to block the interior of the housing 10 (see FIG. 1(b)) from the case heat dissipation holes 37. Consequently, the heat released from the battery case 30 is prevented from permeating into the interior of the housing 10, while the heat released from the battery case 30 can be discharged to the outside of the housing 10 through the gaps S1 and S2 formed between the case storage section 20 and the battery case 30.

Moreover, because the first concave sections 22a1 and the groove sections 22a2 are formed in the first storage side walls 22a, a wider gap S1 is secured between the inner side surfaces of the first storage side walls 22a and the outer side surfaces of the case side walls 32, so that the heat released from the battery case 30 is more readily discharged outside the housing 10 (see FIG. 9). It is noted that since at least part of a plurality of the case heat dissipation holes 37 formed in the case side walls 32 is disposed in positions opposing the first concave sections 22a1 or the groove sections 22a2 when the battery case 30 is stored in the case storage section 20, the heat released from inside the battery case 30 is more efficiently discharged to the outside of the housing 10.

When closing the surface (upper side in FIG. 11) of the battery case 30 with the cover section 40, first, the side thereof where the elastic section 40b is bonded faces the battery case 30. Next, the engaging tab sections 41 formed on one side in the longitudinal direction (right side in FIG. 11) are engaged with the cover locking sections 30a formed on the battery case 30. Lastly, the male screw sections 52a of the second screw members 52 are inserted into the cover insertion holes 42 formed on the other side in the longitudinal direction (left side in FIG. 11), while also being screwed into the second nut members 34a internally fitted into the second fixing sections 34. Accordingly, the cover section 40 is mounted on the battery case 30 in a freely detachable manner. Thus, the cover section 40 becomes fixed to the battery case 30, whereby only the cover section 40 can be attached or detached while the battery case 30 remains mounted in the case storage section 20.

As described above, a thickness of the cover section 40 is set to the extent that the elastic section 40b and the batteries 2 mutually abut in a state in which the surface of the battery case 30 is closed. Consequently, the elastic section 40b is pressed against the batteries 2 by having the surface of the battery case 30 closed with the cover section 40, which securely fixes the batteries 2. As a result, contact failures between the batteries 2 stored in the battery case 30 and the case terminal plates 36, short-circuits and leakages of the batteries 2 are suppressed.

Furthermore, by closing the surface of the battery case 30 with the cover section 40, the tips of the cover protruding sections 43 comprising the elastic section 40b can be abutted on the case terminal plates 36 disposed on either side of the battery chambers 35 in the longitudinal direction (left and right sides in FIG. 11). Hence, the case terminal plates 36 are more securely fixed by taking advantage of the elasticity of the elastic section 40b. Moreover, the vibration of the case terminal plates 36 can be controlled, whereby noise generation caused by the vibration of the case terminal plates 36 is reduced.

As described above, the case terminal holes 38a and 38b are formed in positions to oppose the storage terminal holes 25a and 25b when the battery case 30 is stored in the case storage section 20. Also, the difference between the recess depth of the concave sections 39 (see FIG. 10) from the outer bottom surface of the first fixing section 33 or the outer bottom surface of the case protruding section 34b and the projection height of the convex sections 24 (see FIG. 10) from the inner bottom surface of the storage bottom plate 21 is smaller than the projection height of the bent tip of the bent plates 26a1 and 26b1 from the inner bottom surface of the storage bottom plate 21. In other words, the projection height of the bent tip of the bent plates 26a1 and 26b1 is greater than the height dimension of the gap S2 formed between the inner bottom surface of the storage bottom plate 21 and the outer bottom surface of the case bottom plate 31 when the battery case 30 is stored in the case storage section 20.

Therefore, when the battery case 30 is stored in the case storage section 20, the connection case terminal plates 36a and 36b fixed to the outer bottom surface of the case bottom plate 31 contact the bent plates 26a1 and 26b1. Consequently, the batteries 2 and electrical circuits inside the amplifier with a built-in speaker 1 become electrically connected as soon as the battery case 30 is stored in the case storage section 20, and operations such as connecting the storage terminal plates 26a and 26b with the connection case terminal plates 36a and 36b with a connector or the like are rendered unnecessary. For this reason, the length of time the power supply to the amplifier with a built-in speaker 1 is unavailable is shortened even when battery replacement is required while driving the amplifier with a built-in speaker 1 on the batteries 2.

One side of the bent plates 26a1 and 26b1 (right side in FIG. 11) is a free end, and the other side of the bent plates 26a1 and 26b1 (left side in FIG. 11) is connected to the fixed plates 26a2 and 26b2, respectively, which are fixed to the outer bottom surface of the storage bottom plate 21. Accordingly, when the battery case 30 is stored in the case storage section 20, the bent tips of the bent plates 26a1 and 26ab1 are pushed down by the connection case terminal plates 36a and 36b, respectively, and become elastically deformed towards the free end (right side in FIG. 11) of the bent plates 26a1 and 26b1, so that the bent plates 26a1 and 26ab1 become abutted against the inner wall surfaces of the storage terminal holes 25a and 25b, respectively. Thus, since the storage terminal plates 26a and 26b are fixed as soon as the battery case 30 is stored in the case storage section 20, the vibration of the storage terminal plates 26a and 26b is controlled. As a result, noise generation caused by the vibration of the storage terminal plates 26a and 26b is reduced.

Moreover, since the storage terminal plates 26a and 26b are provided to penetrate the closing members 27, the vibration of the storage terminal plates 26a and 26b can be dampened by the closing members 27. Consequently, noise generated by the vibration of the storage terminal plates 26a and 26b is more firmly restricted.

Additionally, the flow of air in the storage terminal holes 25a and 25b is restricted by the sponge-like closing members 27 between the case storage section 20 and the interior of the housing 10 (see FIG. 1(b)). This makes it possible to prevent abnormal noise (e.g. a whistling sound) from being generated by air inside the housing 10 passing through the storage terminal holes 25a and 25b due to musical sounds outputted from the speaker.

Another embodiment of present invention is described with reference to FIGS. 12 and 13. In the embodiments described above, two each of the convex section 24 and the concave section 39 are provided and the battery case 30 is tightened and fixed in a freely attachable and detachable manner to and from the case storage section 20 by two first screw members 51. In accordance with another embodiment, one each of a convex section 224 and a concave section 239 is provided, and a battery case 230 and a cover section 240 are tightened and fixed to a case storage section 220 by one first screw member 251. It is noted that identical reference numerals are assigned to portions identical to those in the embodiments described above and their descriptions are omitted.

Figure 12:
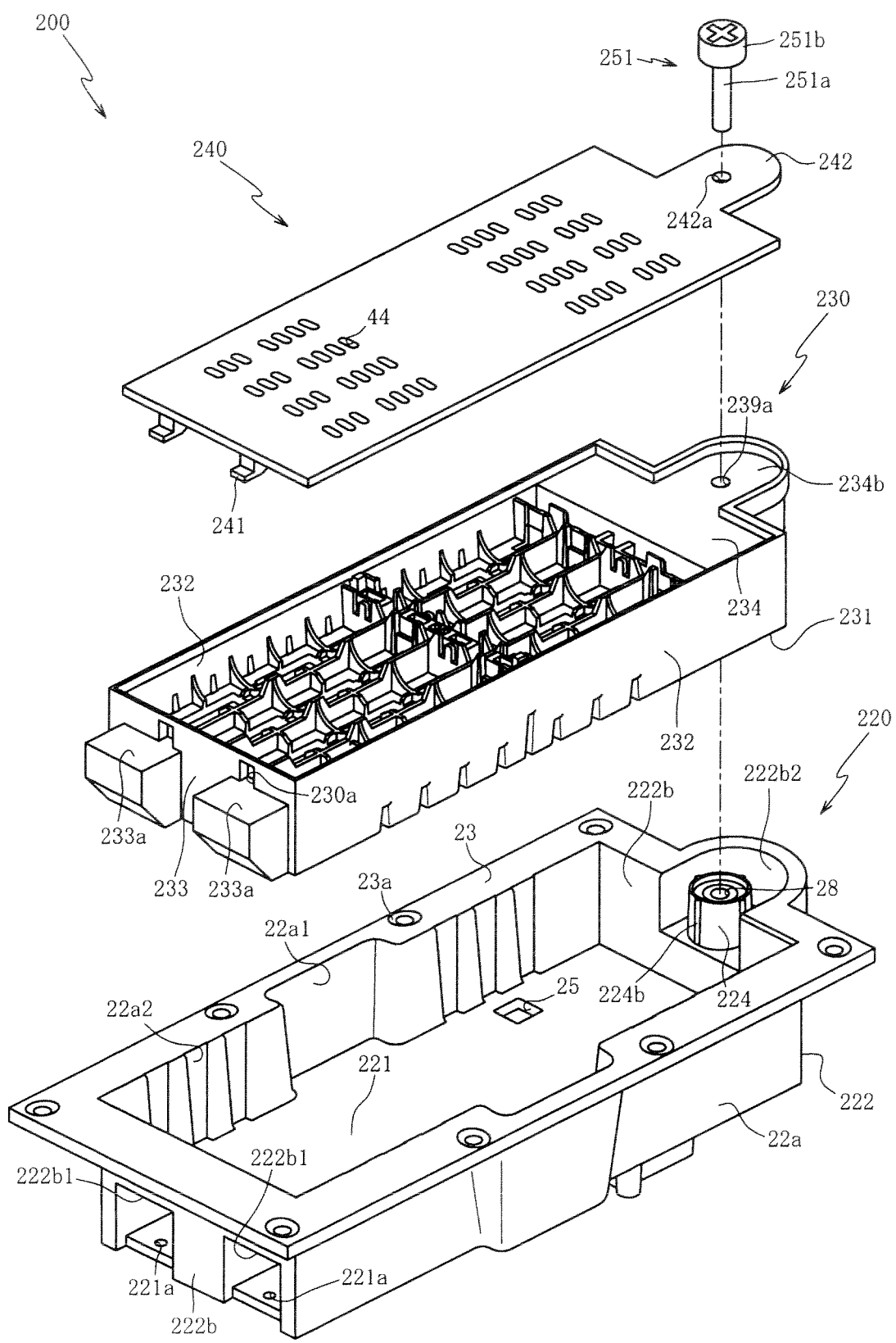
FIG. 12 is an exploded perspective view of a battery storage structure of an amplifier with a built-in speaker in accordance with one embodiment of the present invention.

FIG. 12 is an exploded perspective view of a battery storage structure of an amplifier with a built-in speaker 200 according to one embodiment of the present invention. FIG. 13(a) is a top view of the battery storage structure of the amplifier with a built-in speaker 200. FIG. 13(b) is a partial cross-sectional view of the battery storage structure of the amplifier with a built-in speaker 200 taken along line XIIIb-XIIIb of FIG. 13(a). It is noted that in FIG. 12, the storage terminal plates 26a and 26b and the case terminal plates 36 are omitted. In FIG. 13, the housing 10 is omitted.

As shown in FIG. 12, the amplifier with a built-in speaker 200 is equipped with a generally rectangular case storage section 220 having an open surface, a generally rectangular battery case 230 having an open surface facing in the same direction as the open surface of the case storage section 220 as it is stored in the case storage section 220. A cover section 240 closes the open surface of the battery case 230, and a first screw member 251 tightens and fixes the battery case 230 and the cover section 240 to the case storage section 220 in a freely attachable and detachable manner.

The case storage section 220 is a member for storing the battery case 230 and is formed in a generally rectangular shape with an open surface (upper side in FIG. 12), as described above, and comprises a rectangular storage bottom plate 221 that forms the bottom of the case storage section 220. Four storage side walls 222 are formed upright on outside edges of the storage bottom plate 221.

Of two second storage side walls 222b formed upright on opposite edges of the storage bottom plate 221 in the longitudinal direction (lower left and upper right directions in FIG. 12), the second storage side wall 222b formed upright on one side of the storage bottom plate 221 in the longitudinal direction (lower left side in FIG. 12) is equipped with two case locking sections 222b1 formed as through-holes in the second storage side wall 222b on the one side. The second storage side wall 222b formed upright on the other side of the storage bottom plate 221 in the longitudinal direction (upper right side in FIG. 12) is equipped with a storage protruding section 222b2 projecting outward (upper right side in FIG. 12) from the outer side surface of the second storage side wall 222b on the other side. In addition, the storage bottom plate 221 is provided with two locking protrusions 221a that project from the inner bottom surface of the storage bottom plate 221 located near each of the case locking sections 222b1.

The case locking sections 222b1 and the locking protrusions 221a are members to which engaging protrusions 233a engage when the battery case 230 is stored in the case storage section 220. Additionally, the storage protruding section 222b2 is a member for forming upright a convex section 224.

The battery case 230 is formed in a generally rectangular shape having an open surface (upper side in FIG. 12) and comprises a rectangular case bottom plate 231 that forms the bottom of the battery case 230. Two case side walls 232 are formed upright on opposite edges of the case bottom plate 231 in the width direction (upper left and lower right directions in FIG. 12). A first fixing section 233 is formed upright on the outside edge on one side of the case bottom plate 231 in the longitudinal direction (lower left side in FIG. 12). A second fixing section 234 is connected on the outside edge on the other side of the case bottom plate 231 in the longitudinal direction (upper right side in FIG. 12).

The first fixing section 233 is a portion that locks the cover section 240 and becomes engaged with the case storage section 220 on one side of the battery case 230 in the longitudinal direction (lower left side in FIG. 12) when the battery case 230 is stored in the case storage section 220. The first fixing section 233 is equipped with two cover locking sections 230a formed as through-holes in the first fixing section 233. Engaging convex sections 233a project from the outer side surface of the first fixing section 233.

The second fixing section 234 is a portion that is fixed to the case storage section 220 on the other side of the battery case 230 in the longitudinal direction (upper right side in FIG. 12) when the battery case 230 is stored in the case storage section 220. The second fixing section 234 is equipped with a case protruding section 234a that projects from the other side of the battery case 230 in the longitudinal direction.

The cover section 240 is a plate-shaped member that prevents the batteries 2 (see FIG. 11) stored in the battery case 230 from falling out of the battery case 230. The cover section 240 is provided with engaging tab sections 241 that project outward (lower left direction in FIG. 12) from an end section on one side of the cover section 240 in the longitudinal direction (lower left side in FIG. 12). A cover projection section 242 is provided to project in the longitudinal direction (upper right direction in FIG. 12) from an end section of the other side of the cover section 240 in the longitudinal direction (upper right side in FIG. 12). A cover insertion hole 242a is bored in the cover projection section 242 into which a male screw section 251a of a first screw member 251 may be inserted. The first screw member 251 is provided with a rod-shaped male screw section 251a threaded with a male thread and a head section 251b disposed at one end side of the male screw section 251a.

As shown in FIG. 13(a) or 13(b), the storage protruding section 222b2 is equipped with a solid cone-shaped convex section 224 that projects from the inner bottom surface of the storage protruding section 222b2 towards a side surface (upper side in FIG. 13(b)) of the case storage section 220. The case protruding section 234a is equipped with a concave section 239 provided to recess in the outer bottom surface of the case protrusion section 234a towards the side surface side (upper side in FIG. 13(b)) of the battery case 230. The concave section 239 is provided with a case insertion hole 239a bored from a concave base of the concave section 239 to the side surface (upper side in FIG. 13(a)) of the battery case 230.

The cover locking sections 230a are portions to which the engaging tab sections 241 engage when the surface of the battery case 30 is closed with the cover section 240. The engaging convex sections 233a are portions that are locked by the case locking sections 222b1 and the locking protrusions 221a when the battery case 230 is stored in the case storage section 220.

Figure 13:
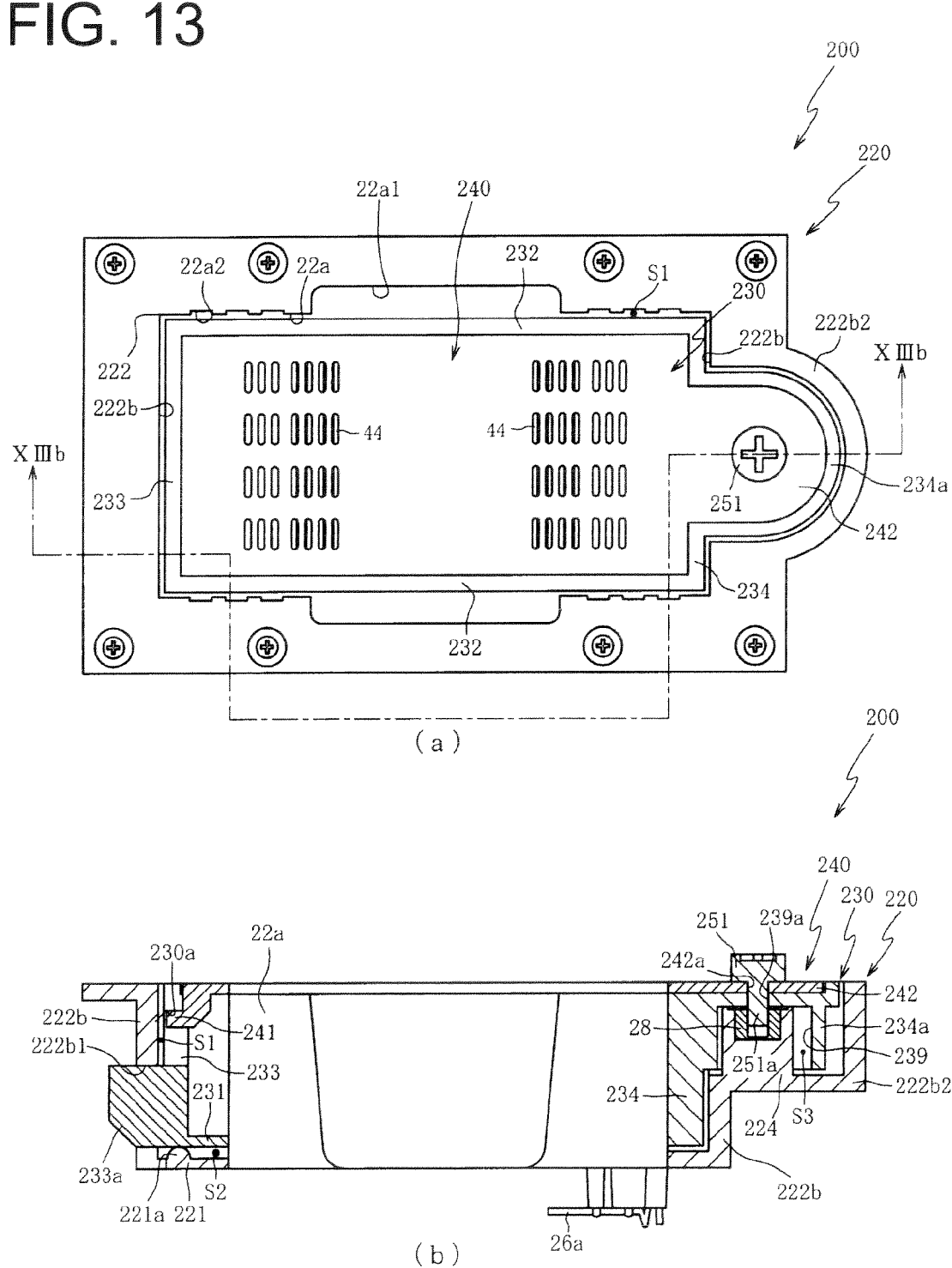
FIG. 13(a) is a top view of a battery storage structure of an amplifier with a built-in speaker in a state in which the batteries are stored in accordance with one embodiment of the present invention.
FIG. 13(b) is a cross-sectional view of a battery storage structure of an amplifier with a built-in speaker along line XIIIb-XIIIb of FIG. 13(a) in accordance with one embodiment of the present invention.

To mount the battery case 230 and the cover 240 in the case storage section 220, first, on one side of the battery case 230 in the longitudinal direction (left side in FIG. 13(b)), the engaging convex sections 233a formed on the first fixing section 233 are engaged with the case locking sections 222b1 formed as through-holes and the locking protrusions 221a on one side of the case storage section 220 in the longitudinal direction (left side in FIG. 13). On the other side of the battery case 230 in the longitudinal direction (right side in FIG. 13(b)), the concave section 239 provided to recess in the case protruding section 234b is loosely fitted onto the convex section 224 provided to project on the storage protruding section 222b2. Next, the engaging tab sections 241 projecting from one side of the cover section 240 in the longitudinal direction (left side in FIG. 13(b)) are engaged with the cover locking sections 230a formed on the first fixing section 233. Lastly, the male screw section 251a of the first screw member 251 is inserted into the cover insertion hole 242 formed on the other side of the cover section 240 in the longitudinal direction (right side in FIG. 13(b)) and the case insertion hole 239a formed on the other side of the battery case 230 in the longitudinal direction, while being screwed into the nut member 28 internally fitted into the convex section 224.

Accordingly, the battery case 230 and the cover section 240 may be tightened and fixed to the case storage section 220 with one first screw member 251, such that battery replacement required when the batteries 2 (see FIG. 11) stored in the battery case 230 are drained is performed more efficiently. Furthermore, because the number of parts for the first screw member 251 is reduced, cost is reduced.

In addition, since the locking protrusions 221a projecting from the inner bottom surface of the storage bottom plate 221 are formed on the storage bottom plate 221, by having the engaging convex sections 233a engage with the case locking sections 222b1 and the locking protrusions 221a, the gap S2 of a predetermined clearance is formed between the inner bottom surface of the storage bottom plate 221 and the outer bottom surface of the case bottom plate 231. As a result, even if the case storage section 220 vibrates, transmission of the vibration of the case storage section 220 from the inner bottom surface of the storage bottom plate 221 to the outer bottom surface of the case bottom plate 231 is averted.

It is noted that the gap S1 of a predetermined clearance is formed between the inner side surfaces of the case storage section 220 and the outer side surfaces of the battery case 230, that is, between the inner side surfaces of the storage side walls 222 and the outer side surfaces of the case side walls 232, the first fixing section 233, the second fixing section 234, and the case protruding section 234b. Additionally, the gap S3 of a predetermined clearance is formed between the ribs 224b (see FIG. 12) formed on the outer side surface of the convex section 224 and the inner side surface of the concave section 239.

Although the invention has been described based on various embodiments, the invention is in no way limited by the embodiments and it should be easily surmised that many modifications can be made without departing from the present invention. For example, in the embodiments described above, the amplifier with a built-in speaker 1 or 200 was used as an example of a subject of application of the present invention, but the present invention is not necessarily limited to these. The present invention is applicable to electronic musical instruments such as a guitar with a built-in speaker, or the like.

In the above embodiments, the description is made as to situations where the case storage section 20 or 220 is screw-fastened to the housing 10, but the present invention is not necessarily limited to these. The case storage section 20 or 220 may be integrated with the housing 10. This would render unnecessary operations to mount the case storage section 20 or 220 in the housing 10. Further, by having the case storage section 20 or 220 integrated with the housing 10, rigidity of the case storage section 20 or 220 can be ensured, which will restrict the vibration of the case storage section 20 or 220 caused by the resonance of the housing 10.

In the above embodiments, the description is made as to situations described where the convex section 24 or 224 is a hollow or solid conical shape, but the present invention is not necessarily limited to these. The convex section 24 or 224 may be in a cylindrical shape or a polygonal column shape.

In the above embodiments, the description is made as to situations where four ribs 24b or 224b are formed circumferentially on the convex section 24 or 224, respectively, but the present invention is not necessarily limited to these. The ribs 24b or 224 may be provided in numbers three or fewer, or five or more.

In the above embodiments, the description is made as to situations where the convex sections 24 or 224 are provided to project from the inner bottom surface of the storage bottom plate 21 or of the storage protruding section 222b towards the one surface side of the case storage section 20 or 220, while the concave section 39 or 239 are provided to recess in the outer bottom surface of the first fixing section 33 or the case protruding section 34b or 234a towards the one surface side of the battery case 30 or 230, but the present invention is not necessarily limited to these. The convex section 24 or 224 may be provided to project from the outer bottom surface of the first fixing section 33 or the case protruding section 34b or 234a towards the other surface side of the battery case 30 or 230, while the concave section 39 or 239 may be provided to recess in the inner bottom surface of the storage bottom plate 21 or 221 towards the other surface side of the case storage section 20 or 220.

In the above embodiments, the description is made as to situations where the first nut member 28 is internally fitted into the convex section 24 or 224, the concave section 39 or 239 is equipped with the case insertion hole 39a or 239a, and the male screw section 51a or 251a of the first screw member 51 or 251 is inserted into the case insertion hole 39a or 239a bored in the concave section 39 or 239 and screwed into the first nut member 28 internally fitted into the convex section 24 or 224, whereby the convex section 24 or 224 and the concave section 39 or 239 are tightened and fixed. However, the present invention is not necessarily limited to these. The first nut member 28 may be disposed in the concave section 39 or 239 and the convex section 24 or 224 may be equipped with the case insertion hole 39a or 239a, and the male screw section 51a or 251a of the first screw member 51 or 251 may be inserted into the case insertion hole 39a or 239a bored in the convex section 24 or 224 and screwed into the first nut member 28 disposed in the concave section 39 or 239, whereby the convex section 24 or 224 and the concave section 39 or 239 are tightened and fixed.

In the above embodiments, the description is made as to situations where the convex section 24 or 224 and the concave section 39 or 239 are tightened and fixed by the first screw member 51 or 251 in a freely attachable and detachable manner. However the present invention is not necessarily limited to these. The convex section 24 or 224 and the concave section 39 or 239 may be fixed through a joining (for example, glued with an adhesive, welded through laser machining or the like). Through this, rattling of the concave section 39 or 239 caused by looseness in the tightening of the first screw member 51 or 251 can be prevented.

In the above embodiments, situations were described where the projection section 24a is formed in a circular ring shape when viewed from the end surface side of the convex end of the convex section 24 or 224, but the present invention is not necessarily limited to these. It may be sufficient for the end surface of the projection section 24a to be formed so that its area is smaller than the area of the end surface of the convex end of the convex section 24 or 224. Furthermore, the projection section 24a may be formed by a plurality of protrusions that project from the convex end of the convex section 24 or 224.

In the above embodiments, the description is made as to situations where the projection section 24a abuts on the concave base of the concave section 39 or 239 when the convex section 24 or 224 and the concave section 39 or 239 are fixed, but the present invention is not necessarily limited to these. An elastic body such as rubber or the like may be intervened between the projection section 24a and the concave base of the concave section 39 or 239 when the convex section 24 or 224 and the concave section 39 or 239 are fixed. Therefore, the projection section 24a and the concave section 39 or 239 can be more firmly fixed and the vibration transmitted from the projection section 24a to the concave section 39 or 239 can be dampened.

In the above embodiments, the description is made as to situations where the projection section 24a projects from the convex end of the convex section 24 or 224 towards the convex direction of the convex section 24 or 224, but the present invention is not necessarily limited to these. The projection section 24a may project from the concave base of the concave section 39 towards the direction the convex section 24 or 224 is loosely inserted.

In the above embodiments, the description is made as to situations where the connection case terminal plates 36a and 36b come into contact with the storage terminal plates 26a and 26b when the battery case 30 or 230 is stored in the case storage section 20 or 220, so that the batteries 2 stored in the battery case 30 or 230 become electrically connected to electrical circuits inside the amplifier with a built-in speaker 1 or 200. However, the present invention is not necessarily limited to these. The batteries 2 stored in the battery case 30 or 230 may be electrically connected to electrical circuits inside the amplifier with a built-in speaker 1 or 200 by connecting connectors disposed on the connection case terminal plates 36a and 36b to connectors disposed on electrical circuits inside the amplifier with a built-in speaker 1 or 200.

Figure 14:
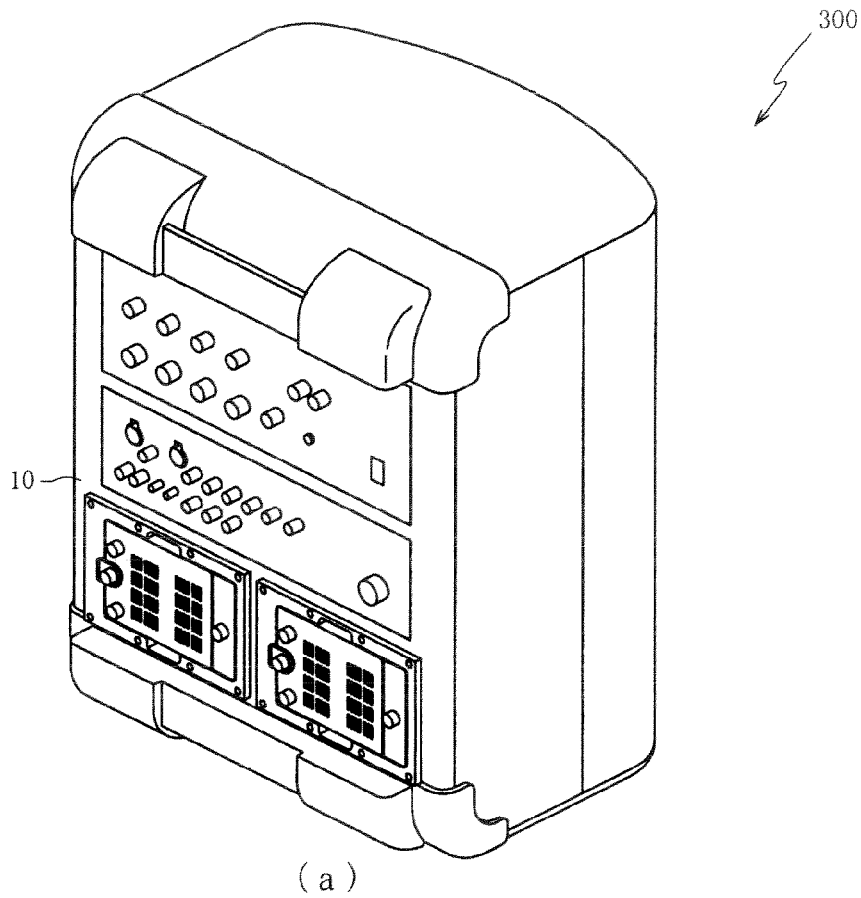
FIG. 14(a) is a rear perspective view of an amplifier with a built-in speaker in accordance with one embodiment of the present invention.
FIG. 14(b) is an electrical block diagram of an amplifier with a built-in speaker in accordance with one embodiment of the present invention.
Figure 14:
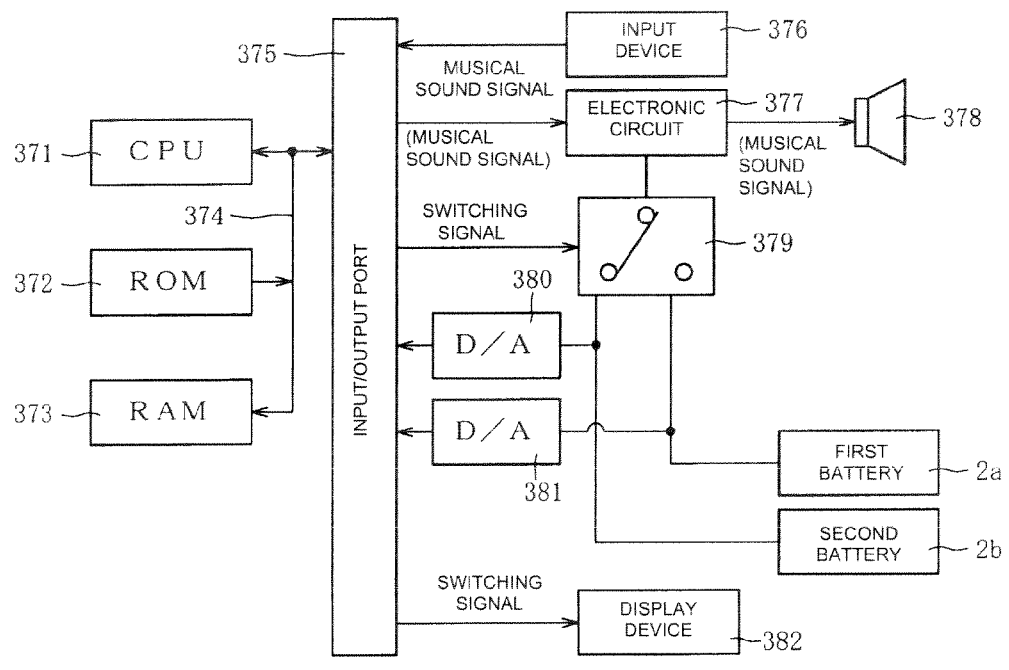

In the above embodiments, situations were described where the battery storage structure according to the present invention is disposed in one location, but the present invention is not necessarily limited to this. The battery storage structure may naturally be disposed in two or more locations. Here, an amplifier with a built-in speaker 300 with the battery storage structure according to the present invention disposed in two locations is described with reference to FIG. 14. FIG. 14(*a*) is a rear perspective view of the amplifier with a built-in speaker 300. FIG. 14(*b*) is an electrical block diagram of the amplifier with a built-in speaker 300.

As shown in FIG. 14(*a*), the battery storage structures according to the present invention are provided side by side on a rear surface side of the amplifier with a built-in speaker 300. It is noted that each of the battery storage structures has the same construction as the battery storage structure described above (i.e., a structure comprising the case storage section 20, the battery case 30 and the cover 40).

As shown in FIG. 14(*b*), the amplifier with a built-in speaker 300 is equipped with a CPU 371, a ROM 372 and a RAM 373, which are connected to an input-output port 375 through a bus line 374. A plurality of devices such as an input device 376 and the like are connected to the input-output port 375.

The CPU 371 is an operation device that controls various portions connected to it through the bus line 374. The ROM 372 is a non-rewritable, non-volatile memory that stores control programs executed by the CPU 371 and fixed value data and the like. The RAM 373 is a memory that rewritably stores various data during control program executions.

The input device 376 is a device that may output to the input-output port 375 musical sound signals inputted from an external device. It is noted that the external device can be, for example, acoustic equipment such as a microphone, guitar or the like. An electronic circuit 377 is an electronic circuit that may include an amplifier that amplifies musical sound signals. A speaker 378 is connected to the electronic circuit 377. Therefore, the musical sound signals inputted from the external device is emitted from the speaker 378.

A switch 379 is a device that switches between DC voltage supply sources (e.g., switching to a first battery 2*a* from a second battery 2*b*) to supply power to the electronic circuit 377. The switch 379 switches the DC voltage supply source based on commands (i.e., switch signals) from the CPU 371.

D/A converters 380 and 381 are converters that convert voltage values (analog values) of the first battery 2*a* and the second battery 2*b* to digital voltage values. The CPU 371 measures the digital voltage value and checks whether the measured value is at or below a predetermined threshold in order to decide on the supply source, and outputs a switch signal to the switch 379 accordingly.

The first battery 2*a* may be a dry-cell battery stored in one battery storage structure (the battery case 30) of the battery storage structures disposed in two locations, while the second battery 2*b* may be a dry-cell battery stored in the other battery storage structure (the battery case 30). In accordance with the present embodiment, the initial voltage of the first battery 2*a* and the second battery 2*b* may be 12V, and the predetermined threshold mentioned above may be 8V.

A display 382 displays the voltage switch status between the first battery 2*a* and the second battery 2*b*. The display 382 may be configured with a red and green bicolor LED provided for each battery. Accordingly, the display may switch between a green light (first mode) when the battery voltage is at an adequate voltage and a red light (second mode) when the battery voltage falls to 10V, for example. In addition, the display may switch to a red flashing light (third mode) when the voltage falls below 9V, for example. As for the battery that is not switched to (i.e., battery not in use), the display may alternate at a predetermined interval between one of the first, second and third modes and a fourth mode, wherein the red and green of the bicolor LED corresponding to the battery not switched to simultaneously emit light (emitted light may appear to be orange). Here, one of the first, second and third modes is displayed according to the battery voltage of the battery not in use. By having the fourth mode displayed at a predetermined interval, it is possible to discern which of the first battery 2*a* and the second battery 2*b* is the battery not in use. Moreover, by having one of the first, second and third modes displayed at a predetermined interval, it is possible to ascertain the voltage of the battery not in use.

The CPU 371 measures the voltage value of the battery supplying voltage (second battery 2*b* in FIG. 14(*b*)) to the electronic circuit 377, and checks if its voltage value is at or below the predetermined threshold (8V). If the voltage value is at or below the predetermined threshold, a switching signal for switching the supply source is outputted to the switch 379. Accordingly, the supply source supplying DC to the electronic circuit 377 switches from the second battery 2*b* to the first battery 2*a*, and the battery with low voltage (the battery case 30) can be replaced as musical sounds continue to emit.

To achieve the objects of the present invention, there is provided a battery storage structure for acoustic equipment having a housing and a speaker that is drivable by a battery and disposed on the housing for storing the battery in the housing. The acoustic equipment is equipped with a box-shaped case storage section that has an opening in one surface thereof and disposed in the housing, a box-shaped battery case that has an opening in one surface thereof and is stored in the case storage section with the opening orientated in the same direction as the opening of the case storage section, and at least one connection section that connects the battery case and the case storage section, wherein a predetermined gap is formed between an inner bottom surface of the case storage section and an outer bottom surface of the battery case and between an inner side surface of the case storage section and an outer side surface of the battery case.

The connection section may include a convex section provided to project from one surface of the inner bottom surface of the case storage section and the outer bottom surface of the battery case, and a concave section provided to recess along a convex direction of the convex section on the other surface of the inner bottom surface of the case storage section and the outer bottom surface of the battery case, wherein a concave depth from the other surface is smaller than a convex height of the convex section from the one surface, and a convex end of the convex section connects to a concave base section of the concave section.

One of the convex end of the convex section and the concave base of the concave section is provided with a projection section that projects towards the other of the convex end of the convex section and the concave base of the concave section, wherein, when, the battery case is stored in the case storage section, the area of an end surface of the projection section that abuts against the other of the convex end of the convex section and the concave base of the concave section is smaller than the area of the one of the convex end of the convex section and the concave base of the concave section. A gap of a predetermined clearance is formed between an outer side surface of the convex section and an inner side surface of the concave section.

The convex section is provided with protruding ribs that project from the outer side surface of the convex section and are provided along a direction in which the convex sections extend. The battery case is detachably attached to the case storage section by screwing at least one set of the convex end of the convex section and the concave base of the concave section with screws. The convex section is provided to project from the inner bottom surface of the case storage section, the concave section is provided to recess in the outer bottom surface of the battery case, and the screws include a male screw section with a male thread threaded from the concave base of the concave section to the convex end of the convex section.

The battery case is equipped with a bottom plate forming the bottom and side walls formed upright at peripheral edges of the bottom plate defining the box shape, and a plurality of heat dissipation holes bored in the bottom plate or the side walls, wherein, in a state in which the battery case is stored in the case storage section, the inner bottom surface or the inner side surfaces of the case storage section is disposed in a position opposing the heat dissipation holes, thereby insulating between the interior of the housing and the heat dissipation holes.

The acoustic equipment is equipped with a plate-shaped cover section that closes the one surface of the battery case, and a conductive first terminal that comes into contact with a positive terminal or a negative terminal of the battery stored inside the battery case, and the cover section is provided with a cover protruding section that projects from one surface side of the cover and abuts against the first terminal in a state in which the one surface of the battery case is closed.

The cover section is equipped with a main body section comprising a resin material and an elastic section that is joined on one surface side of the main body section and comprises an elastic material, wherein the elastic section of the cover section abuts against the battery in a state in which the cover section closes one surface of the battery case storing the battery with the elastic section facing towards the battery case. The cover protruding section is formed at the elastic section.

The case storage section is equipped with terminal holes bored in the bottom of the case storage section and conductive second terminals provided to penetrate the terminal holes and projecting from the inner bottom surface of the case storage section, wherein the second terminals abut against inner walls of the terminal holes while being pressed by the first terminals, in a state in which the battery case is stored in the case storage section. The case storage section is equipped with a closing member that closes the terminal holes and allows the second terminals to penetrate, while restricting communication of air between the case storage section and the interior of the housing.

In accordance with the present invention, the acoustic equipment is equipped with a box-shaped case storage section that has an opening in one surface thereof and disposed in the housing, a box-shaped battery case that has an opening in one surface thereof and is stored in the case storage section with the opening orientated in the same direction as the opening of the case storage section, and at least one connection section that connects the battery case and the case storage section, wherein a predetermined gap is formed between an inner bottom surface of the case storage section and an outer bottom surface of the battery case and between an inner side surface of the case storage section and an outer side surface of the battery case, such that even if the housing were to resonate due to musical sounds outputted from a speaker, transmission of the vibration of the case storage section associated with resonance of the housing to the battery case is restricted.

In other words, as the battery case is connected to the case storage section through the connection section, when the housing resonates, direct transmission of the vibration of the case storage section disposed in the housing from the inner bottom surface and inner side surfaces of the case storage section to the outer bottom surface and outer side surfaces of the battery case can be avoided, so that the vibration of the battery case associated with resonance of the housing is restricted accordingly. This is therefore effective in reducing noise generation that may be caused by vibration of the battery case. As a result, noise that may be caused by the resonance of the housing and would become grating to the ear can be prevented when one listens to musical sounds from the speaker. Further, by restricting the vibration of the battery case, beneficial effects occur such as minimizing contact failures between the battery stored in the battery case and conductive terminals that come in contact with the positive or negative terminal of the battery, short-circuits of the battery, as well as battery leakages.

Furthermore, because the connection section is equipped with a convex section provided to project from one of the inner bottom surface of the case storage section and the outer bottom surface of the battery case, and a concave section provided to recess along a convex direction of the convex section on the other of the inner bottom surface of the case storage section and the outer bottom surface of the battery case, and that a convex end of the convex section connects to a concave base section of the concave section, the battery case can be stored in the case storage section as the convex section is loosely inserted into the concave section. Hence, the concave section is guided by the convex section, which is effective in disposing the battery case in a proper position in the case storage section.

Also, since the recess depth of the concave section in the other surface is formed to be smaller than the projection height of the convex section from the one surface, a gap of a predetermined clearance can be formed between the inner bottom surface of the case storage section and the outer bottom surface of the battery case in a state in which the convex end of the convex section and the concave base of the concave section are connected. Consequently, a benefit occurs in that the transmission of the vibration of the case storage section from the inner bottom surface of the case storage section to the outer bottom surface of the battery case is minimized. As a result, noise generated by the vibration of the battery case is reduced, and contact failures or short-circuits between batteries and terminals and battery leakages are minimized.

In accordance with the present invention, one of the convex end of the convex section and the concave base of the concave section is provided with a projection section that projects towards the other of the convex end of the convex section and the concave base of the concave section, such that when the convex section and the concave section are connected, the projection section can be abutted on the other of the convex end of the convex section and the concave base of the concave section. Further, in a state in which the battery case is stored in the case storage section, the area of an end surface of the projection section that abuts on the other of the convex end of the convex section and the concave base of the concave section is smaller than the area of the one of the convex end of the convex section and the concave base of the concave section, so that the area of contact between the convex section and the concave section can be made smaller, compared to the case where the convex end of the convex section and the concave base of the concave section are abutted on each other without such a projection. This allows transmission of vibration of the case storage section to the battery case to be more securely suppressed. As a result, noise generated by the vibration of the battery case is reduced, and contact failures between the battery and terminals, short-circuits and leakages of the battery are minimized.

Moreover, because a gap of a predetermined clearance is formed between an outer side surface of the convex section and an inner side surface of the concave section, the transmission of vibration of the case storage section from one of the outer side surface of the convex section and the inner side surface of the concave section to the other of the outer side surface of the convex section and the inner side surface of the concave section is minimized. As a result, generation of noise caused by the vibration of the battery case is reduced, and contact failures between batteries and terminals, short-circuits and battery leakages are minimized.

In accordance with the present invention, because the convex section is provided with protruding ribs that project from the outer side surface of the convex section, the ribs and the inner side surface of the concave section can be brought into contact with one another, when the convex section and the concave section come into contact due to vibration of the case storage section or the battery case. That is, since this can make the area of contact when the convex section and the concave section come into contact smaller than a situation where the outer side surface of the convex section and the inner side surface of the concave section come into contact without ribs being provided, the transmission of the vibration from the case storage section to the battery case is reduced. As a result, noise generation caused by the vibration of the battery case is reduced, and contact failures between batteries and terminals, short-circuits and battery leakages are minimized.

On the other hand, as the ribs are provided to extend along the convex direction of the convex section, it is possible to avoid an incident where the ribs impede the effect of the convex section guiding the concave section when the battery case is stored in the case storage section while loosely inserting the convex section in the concave section. Consequently, the convex section can smoothly guide the concave section even with the ribs formed.

In accordance with the present invention, because the battery case is detachably attached to the case storage section by screwing at least one set of the convex end of the convex section and the concave base of the concave section with screws, the area of contact between the convex section and the concave section can be made small, while at the same time securely fixing the convex section and the concave section with the screw. Consequently, the vibration of the battery case associated with the vibration of the case storage section is suppressed. As a result, noise generated by the vibration of the battery case is reduced, and contact failures between batteries and terminals, short-circuits and battery leakages are suppressed.

Furthermore, since the battery case is mounted in a freely detachable manner to the case storage section, by removing the battery case when the acoustic equipment is driven on an AC power source, any noise generation caused by the vibration of the battery case can be avoided. In addition, when batteries stored in the acoustic equipment are drained, the entire battery case can be replaced. In other words, even when a plurality of batteries need to be replaced, the batteries can be replaced efficiently by having batteries stored in a spare battery case in advance and replacing the battery cases. This shortens the length of time the power source to the acoustic equipment is unavailable. Moreover, by providing the acoustic equipment with a structure equipped with a plurality of battery storage structures, even when batteries stored in one battery case are drained, batteries in one battery case may be replaced while driving the acoustic equipment on batteries stored in another battery case.

In accordance with the present invention, because the convex section is provided to project from the inner bottom surface of the case storage section, while the concave section is provided to recess in the outer bottom surface of the battery case, and that a male screw section with a male thread is threaded from the concave base of the concave section to the convex end of the convex section, the screw can be attached to and removed from the battery case side where the concave section is provided to recess, and the screw attachment and removal can be done from the battery case side, or the open side of the battery case. Consequently, attaching and detaching the battery case to and from the case storage section is efficiently performed when the battery case is attached to or detached from the case storage section.

In accordance with the present invention, because the battery case is structured in a box shape defined by a bottom plate forming the bottom and side walls formed upright at the outside edges of the bottom plate, and equipped with a plurality of heat dissipation holes bored in the bottom plate or the side walls, when the acoustic equipment is driven on batteries, the heat generated from the batteries stored inside the battery case can be released outside the battery case through the heat dissipation holes. In addition, in a state in which the battery case is stored, the inner bottom surface or the inner side surface of the case storage section is disposed in a position opposing the heat dissipation holes, blocking the interior of the housing from the heat dissipation holes, whereby the heat released from the battery case is prevented from permeating into the interior of the housing. The heat released from the battery case can be discharged outside the housing through gaps between the case storage section and the battery case.

In accordance with the present invention, because the acoustic equipment is equipped with a plate-shaped cover section that closes one surface of the battery case, and a conductive first terminal that comes in contact with a positive or negative terminal of the battery stored inside the battery case, wherein the cover section is provided with cover protruding sections that project from one surface side of the cover and abut on the first terminal in a state in which the one surface of the battery case is closed, the first terminals can be fixed by closing the one surface of the battery case with the cover section, while pressing the cover protruding sections against the first terminal. As a result, the vibration of the first terminal can be controlled whereby noise generation caused by the vibration of the first terminal is reduced.

In accordance with the present invention, because the cover section is equipped with a main body section comprising a resin material and an elastic section that is joined on one surface side of the main body section and is comprised of an elastic material, and that the elastic section abuts on the batteries in a state in which the cover section closes the one surface of the battery case storing the batteries with the elastic section facing towards the battery case, the cover section can securely control batteries by pressing the elastic section against the batteries while the cover section closes the one surface of the battery case. As a result, contact failures between batteries stored in the battery case and the first terminals, short circuits as well as battery leakages can be more securely suppressed.

In accordance with the present invention, because the cover protruding sections are formed in the elastic section, the first terminals can be more securely fixed by taking advantage of the elasticity of the elastic section constituting the cover protruding sections when the cover protruding sections are pressed against the batteries while the one surface of the battery case is closed by the cover section. Consequently, the vibration of the first terminals can be more firmly controlled to firmly reduce noise generated by the vibration of the first terminals.

In accordance with the present invention, because the case storage section is equipped with terminal holes bored in the bottom of the case storage section and conductive second terminals provided to penetrate the terminal holes and projecting from the inner bottom surface of the case storage section, wherein the second terminals are pressed by the first terminals, in a state in which the battery case is stored in the case storage section, the first terminals and the second terminals can be brought into contact with one another, concurrently with storing the battery case in the case storage section. Since the case storage section and the battery case can be electrically connected simply by storing the battery case in the case storage section, operations such as connecting the first terminals and the second terminals with a connector or the like are rendered unnecessary. This improves the efficiency of a battery case attachment/detachment operation. As a result, the length of time the power supply to the acoustic equipment is unavailable is shortened.

Moreover, the second terminals abut on an inner wall surface of the terminal holes as they are pressed by the first terminals in a state in which the battery case is stored in the case storage section. Consequently, the vibration of the second terminals can be controlled by having the battery case stored in the case storage section. As a result, noise generated by the vibration of the second terminals is reduced.

In accordance with the present invention, because the case storage section is equipped with closing members that close the terminal holes and allow the second terminals to penetrate the terminal holes, the vibration of the second terminals can be dampened by the closing members. Consequently, noise generation that may be caused by the vibration of the second terminals can be more securely suppressed in a state in which the battery case is stored in the case storage section. Additionally, since the closing member limits the flow of air between the case storage section and the housing interior, it is possible to prevent an abnormal noise (e.g. a whistling sound) from being generated when air inside the housing passes through the terminal holes.

The foregoing embodiments and advantages are merely exemplary and are not to be construed as limiting the present invention. The present teaching can be readily applied to other types of apparatuses. The description of the present invention is intended to be illustrative, and not to limit the scope of the claims. Many alternatives, modifications, and variations will be apparent to those skilled in the art. In the claims, means-plus-function clauses are intended to cover the structure described herein as performing the recited function and not only structural equivalents but also equivalent structures.

What is claimed is:

1. A battery storage structure for acoustic equipment, the acoustic equipment comprising a housing and a battery-driven speaker located on the housing, the battery storage structure for storing a battery in the housing and comprising:
    a case storage section located in the housing and having an open surface;
    a battery case having an open surface and stored within the case storage section;
    at least one connection section connecting the battery case to the case storage section,
    wherein a predetermined gap is formed between an inner bottom surface of the case storage section and an outer bottom surface of the battery case,
    wherein a predetermined gap is formed between an inner side surface of the case storage section and an outer side surface of the battery case,
    wherein the open surface of the battery case is oriented in the same direction as the open surface of the case storage section,
    wherein the at least one connection section comprises:
        a convex section projecting from a first surface of the inner bottom surface of the case storage section and the outer bottom surface of the battery case; and
        a concave section recessed along a convex direction of the convex section on a second surface of the inner bottom surface of the case storage section and the outer bottom surface of the battery case,
    wherein a concave depth of the concave section from the second surface is smaller than a convex height of the convex section from the first surface, and
    wherein a convex end of the convex section is connected to a concave base of the concave section.

2. The battery storage structure of claim 1, wherein:
    one of the convex end of the convex section and the concave base of the concave section comprises a projection section that projects toward the other of the convex end of the convex section and the concave base of the concave section; and
    an area of an end surface of the projection section that abuts against the other of the convex end of the convex section and the concave base of the concave section when the battery case is stored in the case storage section is smaller than an area of the one of the convex end of the convex section and the concave base of the concave section.

3. The battery storage structure of claim 1, wherein a predetermined gap is formed between an outer side surface of the convex section and an inner side surface of the concave section.

4. The battery storage of claim 3, wherein the convex section comprises protruding ribs along a direction in which the convex section extends, the protruding ribs projecting from the outer side surface of the convex section.

5. The battery storage structure of claim 1, wherein the battery case is detachably attached to the case storage section by attaching at least the convex end of the convex section or the concave base of the concave section to the battery case with screws.

6. The battery storage structure of claim 5, wherein:
    the convex section projects from the inner bottom surface of the case storage section;
    the concave section is recessed in the outer bottom surface of the battery case; and
    the screws include a male screw section with a male thread threaded from the concave base of the concave section to the convex end of the convex section.

7. The battery storage structure of claim 1, wherein the battery case comprises:
    a bottom plate forming a bottom of the battery case;
    side walls formed upright at peripheral edges of the bottom plate in order to define a shape of the battery case; and
    a plurality of heat dissipation holes bored into the bottom plate or the side walls,
    wherein the inner bottom surface or inner side surfaces of the case storage section is located opposite the plurality of heat dissipation holes of the battery case when the battery case is stored in the case storage section in order to provide insulation between an interior of the housing and the heat dissipation holes.

8. The battery storage structure of claim 1, further comprising:
    a plate-shaped cover section configured to cover the open surface of the battery case; and at least a first conductive terminal that contacts a positive terminal or a negative terminal of the battery stored inside the battery case, wherein the cover section comprises a cover protruding section that projects from a surface of the cover section and abuts against the at least a first conductive terminal when the open surface of the battery case is covered by the cover section.

9. The battery storage structure of claim 8, wherein the cover section further comprises:

a main body section; and an elastic section joined to a surface of the main body section, wherein the main body section and the elastic section comprise a resin material, and wherein the elastic section faces toward the battery case and abuts against the battery when the open surface of the battery case is covered by the cover section.

10. The battery storage structure of claim 9, wherein the cover protruding section is formed at the elastic section.

11. The battery storage structure of claim 8, wherein the case storage section comprises:

terminal holes bored into the inner bottom surface of the case storage section; and at least a second conductive terminal that penetrates the terminal holes and projects from the inner bottom surface of the case storage section, wherein the at least a second conductive terminal abuts against inner walls of the terminal holes when pressed by the at least a first conductive terminal when the battery case is stored in the case storage section.

12. The battery storage structure of claim 11, wherein the case storage section further comprises a closing member configured to close the terminal holes and restrict passage of air between the case storage section and an interior of the housing while allowing the at least a second conductive terminal to penetrate the terminal holes.

* * * * *